(12) United States Patent
Noda et al.

(10) Patent No.: US 10,487,414 B2
(45) Date of Patent: Nov. 26, 2019

(54) SURFACE TREATMENT SYSTEM AND WORKPIECE-HOLDING JIG

(71) Applicant: ALMEX PE INC., Kanuma-shi, Tochigi-ken (JP)

(72) Inventors: Tomohiro Noda, Utsunomiya (JP); Shigeyuki Watanabe, Utsunomiya (JP); Katsumi Ishii, Shioya-machi (JP)

(73) Assignee: ALMEX PE INC., Tochigi-Ken (JP)

(*) Notice: Subject to any disclaimer, the term of this patent is extended or adjusted under 35 U.S.C. 154(b) by 0 days.

(21) Appl. No.: 15/920,179

(22) Filed: Mar. 13, 2018

(65) Prior Publication Data

US 2018/0202063 A1    Jul. 19, 2018

Related U.S. Application Data

(62) Division of application No. 15/140,869, filed on Apr. 28, 2016, now abandoned, which is a division of (Continued)

(30) Foreign Application Priority Data

Jun. 30, 2011  (JP) .................................. 2011-145987
Mar. 22, 2012  (JP) .................................. 2012-065564

(51) Int. Cl.
*C25D 17/08* (2006.01)
*C25D 17/06* (2006.01)
(Continued)

(52) U.S. Cl.
CPC ................ *C25D 17/08* (2013.01); *B05C 3/02* (2013.01); *B05C 3/09* (2013.01); *B05C 3/10* (2013.01);
(Continued)

(58) Field of Classification Search
None
See application file for complete search history.

(56) References Cited

U.S. PATENT DOCUMENTS 4,452,170 A   6/1984  Omata
5,833,816 A   11/1998 Heermann et al.
(Continued)

FOREIGN PATENT DOCUMENTS

JP   S50111699 U   9/1975
JP   S5259038 A    5/1977
(Continued)

OTHER PUBLICATIONS

Official Action dated Sep. 6, 2019 for Japanese Patent Application No. 2017-251034 with translation, 4 pages total.

*Primary Examiner* — Jethro M. Pence
(74) *Attorney, Agent, or Firm* — David L. Hoffman; Hoffman Patent Group

(57) ABSTRACT

A surface treatment system includes a surface treatment tank, a first guide rail and a second guide rail that extend at a position offset from a position over the upper opening of the surface treatment tank, and a plurality of transfer jigs that respectively hold a workpiece and are supported by the first guide rail and the second guide rail. The transfer jig includes a horizontal arm section, a first guide target section that is guided by the first guide rail, a second guide target section that is guided by the second guide rail, and a vertical arm section that is suspended from the horizontal arm section at a position between the first guide target section and the second guide target section, and holds the workpiece.

9 Claims, 18 Drawing Sheets

Related U.S. Application Data application No. 13/537,862, filed on Jun. 29, 2012, now Pat. No. 9,346,632.

(51) Int. Cl.

| | | |
|---|---|---|
| *C25D 17/02* | (2006.01) |
| *B65G 49/04* | (2006.01) |
| *B05C 3/02* | (2006.01) |
| *B05C 3/10* | (2006.01) |
| *B05C 3/09* | (2006.01) |
| *C25D 17/00* | (2006.01) |

(52) U.S. Cl.
CPC ......... *B65G 49/0477* (2013.01); *C25D 17/02* (2013.01); *C25D 17/06* (2013.01); *C25D 17/005* (2013.01)

(56) References Cited

U.S. PATENT DOCUMENTS

| | | | |
|---|---|---|---|
| 5,904,820 A * | 5/1999 | Brown .................. | C25D 17/06 204/225 |
| 9,346,632 B2 | 5/2016 | Noda et al. | |
| 2001/0037943 A1 | 11/2001 | Park et al. | |
| 2003/0097982 A1 | 5/2003 | Ehrenleitner et al. | |
| 2004/0159550 A1 | 8/2004 | Yoshioka | |
| 2008/0142367 A1 | 6/2008 | Von Gutfeld et al. | |
| 2008/0152836 A1 | 6/2008 | Huang et al. | |

FOREIGN PATENT DOCUMENTS

| | | | |
|---|---|---|---|
| JP | 55119195 | 9/1980 | |
| JP | 9505639 | 6/1997 | |
| JP | 11193499 | 7/1999 | |
| JP | 2000226697 | 8/2000 | |
| JP | 3153550 B2 * | 4/2001 | ............ A61F 13/58 |
| JP | 2003013296 | 1/2003 | |
| JP | A2003013293 A | 1/2003 | |
| JP | 2003096596 | 4/2003 | |
| JP | 2004516136 A | 6/2004 | |
| JP | 2007023348 A | 2/2007 | |
| JP | 2007262583 | 10/2007 | |
| JP | 2009132956 | 6/2009 | |
| JP | 2009132999 | 6/2009 | |
| JP | 3153550 U | 10/2009 | |
| JP | 2009287100 | 10/2009 | |
| JP | 2009287100 A | 10/2009 | |
| JP | 2009293064 A | 12/2009 | |
| JP | 2013011009 A | 1/2013 | |
| WO | WO9531590 | 11/1995 | |

* cited by examiner

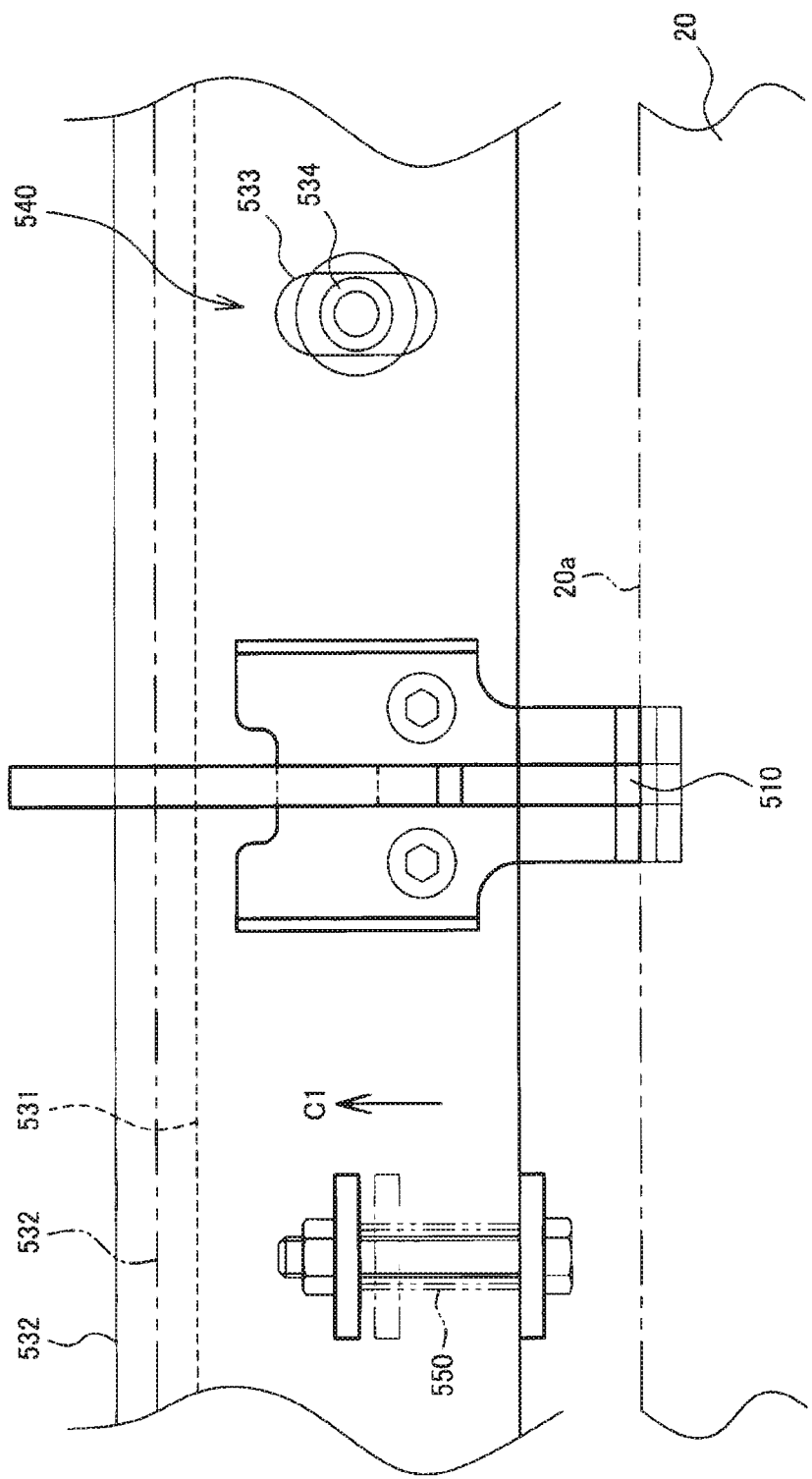

SURFACE TREATMENT SYSTEM AND WORKPIECE-HOLDING JIG

CROSS REFERENCE TO RELATED APPLICATION(S)

This application claims priority from and is a divisional application of U.S. patent application Ser. No. 15/140,869, filed Apr. 28, 2016, which claims priority from and is a divisional application of U.S. patent application Ser. No. 13/537,862, filed Jun. 29, 2012, now U.S. Pat. No. 9,346,632, issued May 24, 2016, and both incorporated by reference herein, which claims priority from Japanese Patent Application No. 2011-145987, filed on Jun. 30, 2011, and Japanese Patent Application No. 2012-65564, filed on Mar. 22, 2012.

BACKGROUND OF THE INVENTION

Field of the Invention

The present invention relates to a surface treatment system (e.g., serial (continuous) plating system) and a workpiece-holding jig.

Description of the Related Art

A serial plating system that serially (continuously) transfers workpieces (e.g., circuit boards) in a plating tank has been known as a surface treatment system such as an electroplating system that plates the surface of a workpiece. The workpiece is suspended from a transfer jig that is transferred along a feed rail, and serially transferred in the plating tank while current is supplied to the workpiece from the feed rail via the transfer jig. Anodes are disposed in the plating tank on either side of a transfer path of the workpiece (i.e., cathode). An electric field is formed between the cathode and the anode to electrolyze the plating solution and plate the surface of the workpiece.

A structure has been known in which the feed rail extends in parallel to the longitudinal direction of the plating tank at a position offset from a position above the plating tank (see Japanese Patent No. 3591721) instead of disposing the feed rail above the plating tank (see Japanese Patent No. 3025254). This makes it possible to prevent a situation in which dust that occurs when the transfer jig slides on the feed rail is mixed into the plating tank.

A surface treatment system such as a serial plating system is configured so that a workpiece is suspended from a workpiece-holding jig, and serially transferred in a solution contained in a surface treatment tank. The workpiece-holding jig normally holds the upper side (end) of the workpiece in a suspended state (see JP-A-2009-132956).

The workpiece-holding jig also has a function of setting the workpiece as a cathode with respect to an anode disposed in the surface treatment tank. An electric field is formed between the cathode and the anode to electrolyze the plating solution and plate the surface of the workpiece. Therefore, a chuck member that holds the upper side (end) of the workpiece is formed using a conductive member, and the workpiece is set as the cathode through the workpiece-holding jig.

In Japanese Patent No. 3025254, the transfer jig and the workpiece are suspended and stably supported right under the feed rail. On the other hand, when disposing the feed rail at a position offset from a position above the plating tank (see Japanese Patent No. 3591721), the center of gravity of the transfer jig and the workpiece is offset from the perpendicular line that passes through the feed rail, so that an unnecessary moment acts on the transfer jig.

Therefore, the transfer jig disclosed in Japanese Patent No. 3591721 has a complex structure as compared with the jig disclosed in Japanese Patent No. 3025254 in order to suppress a problem due to an unnecessary moment. For example, Japanese Patent No. 3591721 provides a removal prevention rail that prevents removal of the transfer jig on the side surface of the feed rail. Therefore, the structure of the feed rail also becomes complex.

If the workpiece is tilted to intersect the transfer direction when viewed from above when the workpiece that is held by the transfer jig advances in the treatment solution, the workpiece may be bent due to the treatment solution, so that the commercial value of the workpiece may be impaired. If a vertical motion of the transfer jig occurs when the workpiece that is held by the transfer jig advances in the treatment solution, the electrical contact between the feed rail and the transfer jig may be impaired, so that the plating quality may deteriorate. In order to prevent such a situation, it is necessary to employ a complex structure for stabilizing the travel of the transfer jig.

It was also found that it is difficult to ensure the in-plane uniformity of the surface treatment of the workpiece when providing only a current-carrying path that is connected to the upper side (end) of the workpiece (see JP-A-2009-132956).

SUMMARY OF THE INVENTION

Several aspects of the invention may provide a surface treatment system that can support a transfer jig in a very stable manner by improving the structure of a transfer jig that is transferred along a rail disposed at a position offset from a position above a surface treatment tank.

Several aspects of the invention may provide a workpiece-holding jig that can transfer a workpiece without causing breakage due to liquid pressure or the like even if the workpiece is very thin.

Several aspects of the invention may provide a surface treatment system in which a feed rail is provided separately from a guide rail, and a feed target section that receives current from the feed rail always comes in contact with the feed rail at a moderate contact pressure independently of the transfer state of a transfer jig.

Several aspects of the invention may provide a workpiece-holding jig and a surface treatment system that can improve the in-plane uniformity of the current distribution of a workpiece, and can further improve the surface treatment quality of the workpiece.

(1) According to one aspect of the invention, there is provided a surface treatment system comprising:

a surface treatment tank that holds a treatment solution, and has an upper opening;

a first guide rail and a second guide rail that extend along a first direction that is parallel to a longitudinal direction of the surface treatment tank at a position offset from a position over the upper opening of the surface treatment tank; and a plurality of transfer jigs that respectively hold a workpiece that is immersed in the treatment solution contained in the surface treatment tank, and are supported by the first guide rail and the second guide rail, each of the plurality of transfer jigs including:

a horizontal arm section that extends along a second direction that intersects the first direction;

a first guide target section that is supported on one end of the horizontal arm section, and is guided by the first guide rail;

a second guide target section that is supported on another end of the horizontal arm section, and is guided by the second guide rail; and a vertical arm section that is suspended from the horizontal arm section at a position between the first guide target section and the second guide target section, and holds the workpiece.

Specifically, each transfer jig has a doubly supported beam configuration in which the first guide target section and the second guide target section positioned on either side of the vertical arm section (that holds the workpiece) in the second direction are supported by the first guide rail and the second guide rail. This makes it possible to stably transfer the workpiece in a horizontal direction by suppressing occurrence of an unnecessary moment, and suppressing the vertical motion of the transfer jig as compared with the cantilever configuration disclosed in Japanese Patent No. 3591721. Moreover, since the first guide rail, the second guide rail, the first guide target section, and the second guide target section (i.e., sliding sections) are provided at a position offset from a position over the upper opening of the surface treatment tank, it is possible to prevent a situation in which dust or the like falls into the surface treatment tank and contaminates the plating solution.

(2) According to another aspect of the invention, there is provided a surface treatment system comprising:

a surface treatment tank that holds a treatment solution, and has an upper opening;

a first guide rail and a second guide rail that extend along a first direction that is parallel to a longitudinal direction of the surface treatment tank at a position offset from a position over the upper opening of the surface treatment tank;

a feed rail that extends along the first direction between the first guide rail and the second guide rail at a position offset from a position over the upper opening of the surface treatment tank; and a plurality of transfer jigs that respectively hold a workpiece that is immersed in the treatment solution contained in the surface treatment tank, and are supported by the first guide rail and the second guide rail, the plurality of transfer jigs coming in contact with the feed rail, and receiving current from the feed rail, each of the plurality of transfer jigs including:

a horizontal arm section that extends along a second direction that intersects the first direction;

a first guide target section that is supported on one end of the horizontal arm section, and is guided by the first guide rail;

a second guide target section that is supported on another end of the horizontal arm section, and is guided by the second guide rail;

a vertical arm section that is suspended from the horizontal arm section at a position between the first guide target section and the second guide target section, and holds the workpiece; and a feed target section that is supported by the horizontal arm section at a position between the guide target section and a vertical arm section, and comes in contact with the feed rail.

According to this aspect of the invention, the surface treatment system includes the feed rail in addition to the first guide rail and the second guide rail, and the transfer jig further includes the feed target section that comes in contact with the feed rail. Since the feed rail is disposed between the first guide rail and the second guide rail at a position offset from a position over the upper opening of the surface treatment tank, the feed target section of the transfer jig is provided at a position between the first guide target section and the vertical arm section. Therefore, the distance from the vertical arm section to the first guide target section is longer than the distance from the vertical arm section to the second guide target section. If the second guide target section is not present, the length of the arm that extends from the first guide target section to the vertical arm section increases, so that an unnecessary moment that acts on the transfer jig increases. Since the transfer jig has a doubly supported beam configuration in which the first guide target section and the second guide target section are supported by the first guide rail and the second guide rail, an unnecessary moment does not act on the transfer jig.

(3) According to another aspect of the invention, there is provided a workpiece-holding jig that holds a sheet-like rectangular workpiece in a solution contained in a treatment tank, the workpiece-holding jig comprising:

a plurality of first chuck members that hold a first side of the rectangular workpiece;

a plurality of second chuck members that hold a second side of the rectangular workpiece, the second side being opposite to the first the side in a first direction; and a frame-like member that is disposed to surround the rectangular workpiece, and supports the plurality of first chuck members and the plurality of second chuck members, the frame-like member including:

a first guide section that guides the plurality of first chuck members so that the plurality of first chuck members are movable along the first direction; and a first biasing member that biases the plurality of first chuck members in one direction in which the plurality of first chuck members move away from the plurality of second chuck members along the first direction.

The workpiece-holding jig is configured so that at least the plurality of first chuck members among the plurality of first chuck members and the second chuck members that hold the opposing sides of the rectangular workpiece are movable along the first direction. Therefore, tension is always applied to the rectangular workpiece so that the planarity of the workpiece can be maintained even if the rectangular workpiece has a small thickness. This makes it possible to surface-treat each side of the rectangular workpiece with a uniform thickness. Moreover, since the planarity of the workpiece can be maintained without warping even when the rectangular workpiece is repeatedly immersed in and removed from the treatment solution during the surface treatment, it is possible to prevent a situation in which the liquid pressure applied would cause warping. This makes it possible to prevent a situation in which the workpiece is removed from the chucks, or damaged due to liquid pressure.

(4) According to another aspect of the invention, there is provided a surface treatment system comprising:

a surface treatment tank that holds a treatment solution, and has an upper opening;

a guide rail and a feed rail that extend along a first direction that is parallel to a longitudinal direction of the surface treatment tank at a position offset from a position over the upper opening of the surface treatment tank; and a plurality of transfer jigs that respectively hold a workpiece that is immersed in the treatment solution contained in the surface treatment tank, and are supported by the guide rail, the plurality of transfer jigs coming in contact with the feed rail, and receiving current from the feed rail, each of the plurality of transfer jigs including:

a horizontal arm section that extends along a second direction that intersects the first direction;

a guide target section that is supported on one end of the horizontal arm section, and is guided by the guide rail; and a feed target section that is supported by the horizontal arm section at a position between the guide target section and a vertical arm section, and comes in contact with the feed rail, the feed target section including:

a contact section that comes in contact with the feed rail;

a parallel link mechanism that connects the horizontal arm section and the contact section; and a biasing member that rotationally biases the parallel link mechanism to apply a contact pressure to the contact section.

According to this aspect of the invention, the feed rail is provided in addition to the guide rail, and the feed target section that receives current from the feed rail can be caused to always come in contact with the feed rail at a moderate contact pressure independently of the transfer state of the transfer jig.

(5) According to another aspect of the invention, there is provided a workpiece-holding jig that vertically holds a sheet-like rectangular workpiece in a solution contained in a treatment tank, and sets the rectangular workpiece as a cathode, the workpiece-holding jig comprising:

a frame-like member that is disposed to surround the rectangular workpiece;

a plurality of conductive first chuck members that are supported by the frame-like member, and hold an upper side of the rectangular workpiece;

a plurality of conductive second chuck members that are supported by the frame-like member in a state in which the plurality of second chuck members are electrically insulated from the plurality of first chuck members, and hold a lower side of the rectangular workpiece;

a first current-carrying section that supplies current to the plurality of first chuck members; and a second current-carrying section that supplies current to the plurality of second chuck members.

According to this aspect of the invention, the workpiece is held in a vertical state by holding the upper side and the lower side of the workpiece in order to prevent a situation in which it is impossible to maintain the suspended state of the workpiece due to liquid pressure particularly when subjecting a very thin workpiece to surface treatment. When the frame-like member, the first chuck members, and the second chuck members are electrically connected, the resistance of the current-carrying path that reaches the lower frame member that supports the second chuck members is inevitably higher than the resistance of the current-carrying path that reaches the upper frame member that supports the first chuck members. When holding only the upper side (end) of the workpiece using the holding jig, the current-carrying path is limited to the upper frame member. Therefore, the flow of current from the anode to the workpiece and the frame-like member via the treatment solution (or the flow of current in the reverse direction) more easily occurs on the upper side of the workpiece that is held by the workpiece-holding jig, so that the in-plane current distribution of the workpiece becomes non-uniform. The in-plane uniformity of the current distribution of the workpiece affects the surface treatment quality of the workpiece. According to this aspect of the invention, the first chuck members and the second chuck members are electrically insulated, and current is supplied to the first chuck members and the second chuck members through the first current-carrying section and the second current-carrying section, respectively. Therefore, the resistance and the current value of the first current-carrying path from the first current-carrying section to the first chuck members, and the resistance and the current value of the second current-carrying path from the second current-carrying section to the second chuck members, can be set independently. This makes it possible to improve the in-plane uniformity of the current distribution of the workpiece, and further improve the surface treatment quality of the workpiece.

(6) In the workpiece-holding jig as defined in (5), the frame-like member may include:

a conductive upper frame member that supports the plurality of first chuck members;

a conductive lower frame member that supports the plurality of second chuck members;

two insulating members that are provided on either end of the upper frame member; and two conductive vertical frame members, an upper end of the two vertical frame members being respectively supported by the two insulating members, and a lower end of the two vertical frame members being connected to either end of the lower frame member, the first current-carrying section may supply current to the upper frame member, and the second current-carrying section may supply current to the two vertical frame members.

In this case, the first current-carrying section supplies current to the first chuck members via the upper frame member, and the second current-carrying section supplies current to the second chuck members via the two vertical frame members and the lower frame member. Since the upper frame member and the two vertical frame members are electrically insulated by the two insulating members, the resistance and the current value of each current-carrying path can be set independently.

(7) The workpiece-holding jig as defined in (6) may further comprise:

a common current-carrying section that supports the frame-like member via part of the first current-carrying section, and supplies current to the first current-carrying section and the second current-carrying section.

According to the above configuration, the conductive member provided as the transfer section among the functional sections (transfer section and workpiece-holding section) of the workpiece-holding jig can be used as the common current-carrying section, and the common current-carrying section can be used as a support section that supports the frame-like member, so that the number of parts can be reduced.

(8) In the workpiece-holding jig as defined in (7), the first current-carrying section may include:

an insulating section that is secured on the common current-carrying section;

a conductive connection section that connects the insulating section and the upper frame member; and at least one upper frame current-carrying cable that connects the common current-carrying section and the connection section, and the second current-carrying section may include a first vertical frame current-carrying cable and a second vertical frame current-carrying cable that connect the common current-carrying section and the two vertical frame members.

According to the above configuration, since the first current-carrying section includes the insulating section that is secured on the common current-carrying section, and the conductive connection section that connects the insulating section and the upper frame member, the first current-carrying section can be used as a support section that supports the frame-like member together with the current-carrying section, so that the number of parts can be reduced. The current-carrying paths from the common current-carrying section can be separately provided using the at least one upper frame current-carrying cable, the first vertical frame current-carrying cable, and the second vertical frame current-carrying cable.

(9) In the workpiece-holding jig as defined in (8), the connection section may include:

a first vertical arm section and a second vertical arm section that connect the insulating section and the upper frame member;

a first protrusion section that protrudes from the first vertical arm section; and a second protrusion section that protrudes from the second vertical arm section, and the at least one upper frame current-carrying cable may include a first upper frame current-carrying cable that connects the common current-carrying section and the first protrusion section, and a second upper frame current-carrying cable that connects the common current-carrying section and the second protrusion section.

When providing the first protrusion section and the second protrusion section in addition to the first vertical arm section and the second vertical arm section having a connection function, the first protrusion section and the second protrusion section may be allowed to function as a redundant section that increases the current-carrying path of the first current-carrying section, or may be formed of a material that differs from the material that forms the first vertical arm section and the second vertical arm section. More specifically, one of the first vertical frame current-carrying cable and the second vertical frame current-carrying cable (i.e., second current-carrying section) and one of the two vertical frame members form a current-carrying path between the common current-carrying section and the lower frame member. Since the vertical frame member is relatively long, and must be reduced in cross-sectional area in order to reduce the weight, the vertical frame member has a relatively high resistance. Therefore, the first current-carrying section is provided with a relatively high resistance using one of the first vertical arm section and the second vertical arm section and one of the first protrusion section and the second protrusion section so that a balance with the relatively high resistance of the vertical frame member is achieved. If a balance with the relatively high resistance of the vertical frame member can be achieved, it is possible to use cables that are identical in length and cross-sectional area of the current-carrying section as the first upper frame current-carrying cable, the second upper frame current-carrying cable, the first vertical frame current-carrying cable, and the second vertical frame current-carrying cable. This makes it possible to reduce the frequency of erroneous installation.

(10) In the workpiece-holding jig as defined in any one of (7) to (9), a resistance of a current path from the common current-carrying section to the upper frame member and a resistance of a current path from the common current-carrying section to the lower frame member may be set to be substantially equal.

This makes it possible to improve the in-plane uniformity of the current distribution of the workpiece, and further improve the surface treatment quality of the workpiece.

(11) In the workpiece-holding jig as defined in any one of (6) to (10), each of the two insulating members may include a guide section that slidingly guides an upper end of either of the two vertical frame member in a vertical direction. According to the above configuration, the weight of the two vertical frame members, the lower frame member, and the second chuck members is applied to the lower end of the workpiece that is supported by the first chuck members on the upper end, so that the workpiece can be held (maintained) in a vertical state due to tension. Therefore, deformation of the workpiece is prevented even if the liquid pressure in the surface treatment tank is applied to the workpiece.

(12) The workpiece-holding jig as defined in (11) may further include a biasing member that biases either of the two vertical frame member that is slidingly guided by the guide section in a downward direction. According to the above configuration, the biasing force of the biasing member is applied to the lower end of the workpiece that is supported by the first chuck members on the upper end in addition to the weight of the vertical frame members, the lower frame member, and the second chuck members, so that the workpiece can be held (maintained) in a vertical state due to additional tension.

(13) In the workpiece-holding jig as defined in (12), a lower end of the biasing member may be secured on either of the two vertical frame members that is slidingly guided by the guide section, an upper end of the biasing member may be secured on a conductive stationary member that is supported by either of the two insulating members, and either of the first and second vertical frame current-carrying cables may be connected to the stationary member. The first and second vertical frame current-carrying cables thus supply current to the vertical frame member via the stationary member and the biasing member. Alternatively, the first and second vertical frame current-carrying cable may be connected directly to the vertical frame member.

(14) According to another aspect of the invention, there is provided a surface treatment system comprising:

a surface treatment tank that holds a treatment solution, and has an upper opening;

the workpiece-holding jig as defined in any one of the above (5) to (13) that holds a workpiece that is immersed in the treatment solution contained in the surface treatment tank in a suspended state, and sets the workpiece as a cathode; and an anode that is disposed in the surface treatment tank at a position opposite to the workpiece.

(15) According to another aspect of the invention, there is provided a surface treatment system comprising:

a surface treatment tank that holds a treatment solution, and has an upper opening;

a workpiece-holding jig that holds a workpiece that is immersed in the treatment solution contained in the surface treatment tank in a suspended state, and sets the workpiece as a cathode;

an anode that extends in the surface treatment tank in a vertical direction, and is disposed at a position opposite to the workpiece; and a relay current-carrying section that supplies current to the anode at a position lower than a liquid surface of the treatment solution contained in the surface treatment tank.

According to this aspect of the invention, current supplied from the relay current-carrying section flows through the anode in the upward direction and the downward direction from the contact position of the relay current-carrying section when flowing toward the workpiece (i.e., cathode) through the treatment solution contained in the surface treatment tank. Therefore, current flows through the workpiece to implement an improved (uniform) current distribution in the vertical direction.

(16) In the surface treatment system as defined in (15), the workpiece-holding jig may include:
a frame-like member that is disposed to surround the workpiece;
a plurality of conductive first chuck members that are supported by the frame-like member, and hold an upper side of the workpiece;
a plurality of conductive second chuck members that are supported by the frame-like member in a state in which the plurality of second chuck members are electrically insulated from the plurality of first chuck members, and hold a lower side of the workpiece;
a first current-carrying section that supplies current to the plurality of first chuck members; and
a second current-carrying section that supplies current to the plurality of second chuck members.

According to the above configuration, it is possible to improve the in-plane uniformity of the current distribution of the workpiece, and further improve the surface treatment quality of the workpiece due to the effects achieved by (5) and (14).

BRIEF DESCRIPTION OF THE DRAWINGS

FIG. 9 is a partial enlarged view illustrating a frame-like member of a workpiece-holding jig.

DESCRIPTION OF THE PREFERRED EMBODIMENT(S)

Exemplary embodiments of the invention are described in detail below. Note that the following exemplary embodiments do not in any way limit the scope of the invention defined by the claims laid out herein. Note that all elements of the following exemplary embodiments should not necessarily be taken as essential elements of the invention.

1. Outline of Surface Treatment System

Figure 1:
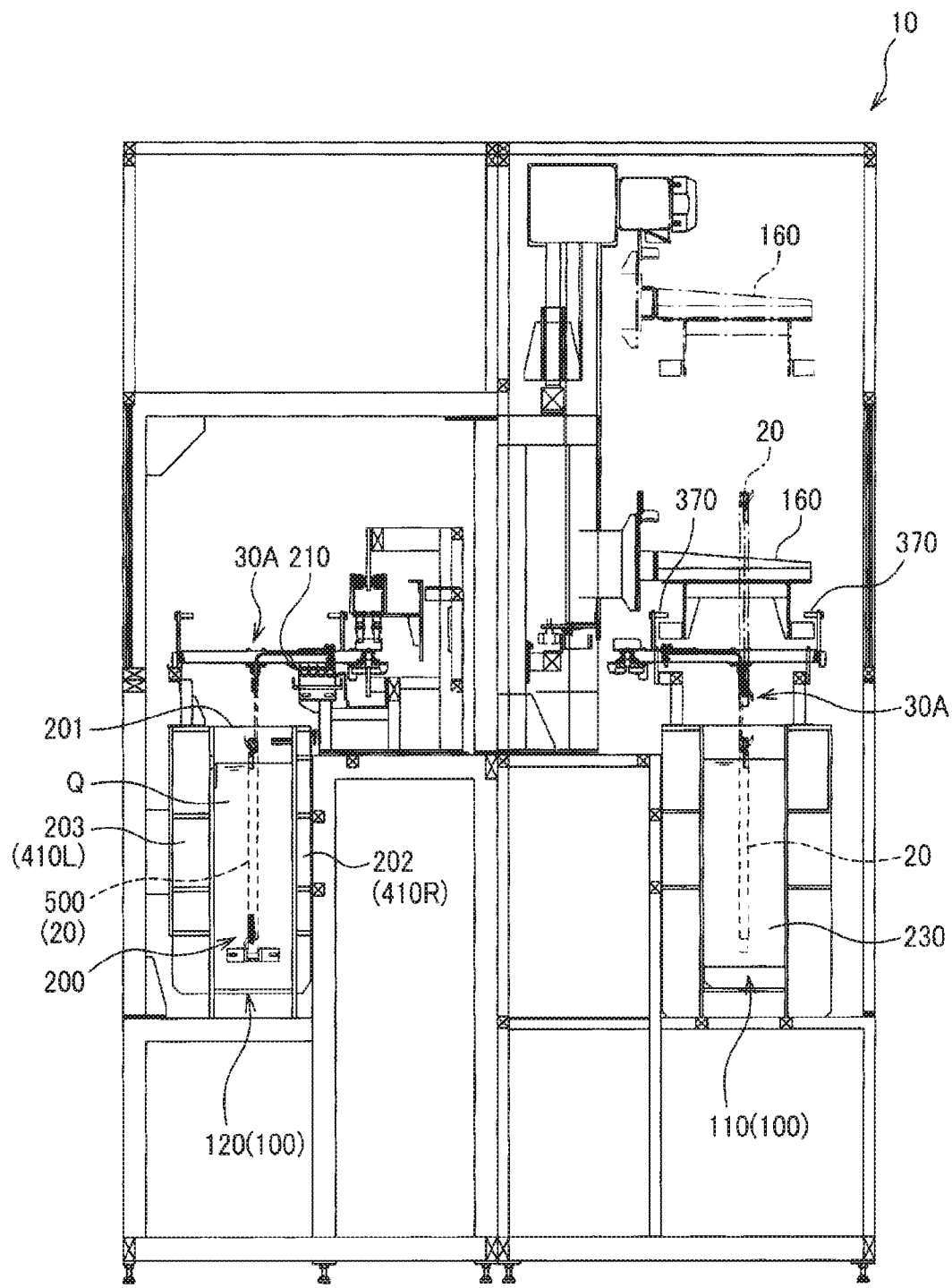
FIG. 1 is a vertical cross-sectional view illustrating a surface treatment system according to one embodiment of the invention.

FIG. 1 is a vertical cross-sectional view illustrating a surface treatment system (e.g., serial (continuous) plating system). A serial plating system 10 illustrated in FIG. 1 is configured so that a plurality of transfer jigs 30A that respectively hold a workpiece 20 (e.g., circuit board) are transferred (circulated) in the direction perpendicular to the sheet. FIG. 1 illustrates two linear transfer paths 110 and 120 that form a circulating transfer path 100 and are parallel to each other. The linear transfer paths 110 and 120 are connected at both ends to form the loop-like circulating transfer path 100.

The circulating transfer path 100 is provided with a plating tank (surface treatment tank in a broad sense) 200 in which the workpiece 20 held by each transfer jig 30A is subjected to surface treatment (e.g., plating), a mounting section (not illustrated in FIG. 1) that is provided on the upstream side of the plating tank 200 in the circulating transfer path 100 and mounts the untreated workpiece 20 on each transfer jig 30A, and a removal section (not illustrated in FIG. 1) that is provided on the downstream side of the plating tank 200 in the circulating transfer path 100 and removes the treated workpiece 20 from each transfer jig 30A.

In one embodiment of the invention, the plating tank 200 is provided along the second linear transfer path 120, and the mounting section and the removal section are provided in the first linear transfer path 110. The circulating transfer path 100 is also provided with a pretreatment tank group 230 that is disposed on the upstream side of the plating tank 200, and a post-treatment tank group (not illustrated in FIG. 1) that is disposed on the downstream side of the plating tank 200.

The pretreatment tank group 230 includes a degreasing tank, a hot rinse tank, a rinse tank, a shower tank, an acid cleaning tank, and the like that are sequentially disposed from the upstream side between the mounting section and the plating tank 200. The post-treatment tank group includes a shower tank and a rinse tank that are sequentially disposed from the upstream side between the plating tank 200 and the removal section. Note that the number and the types of tanks included in the pretreatment tank group 230 and the post-treatment tank group may be appropriately changed.

2. Transfer Jig and Two Guide Rails

Figure 2:
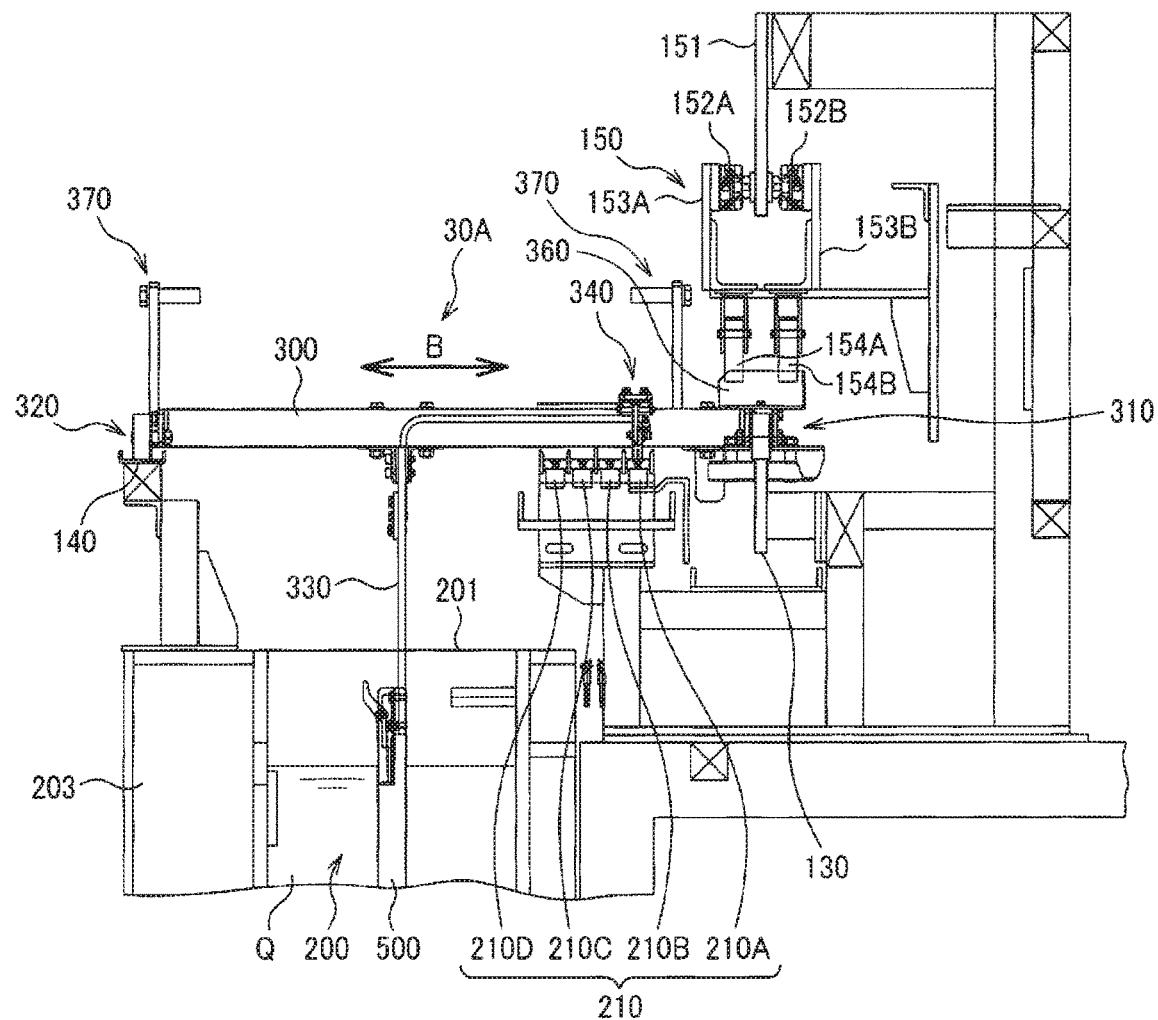
FIG. 2 is a partial enlarged view of the surface treatment system illustrated in FIG. 1.

As illustrated in FIG. 1, the serial plating system 10 includes the plating tank (surface treatment tank in a broad sense) 200 that holds a plating solution (treatment solution in a broad sense) and has an upper opening 201. As illustrated in FIG. 2 (enlarged view), the serial plating system 10 also includes a first guide rail 130 and a second guide rail 140 that extend along a first direction (i.e., the direction perpendicular to the sheet) that is parallel to the longitudinal direction of the plating tank 200 at a position offset from a position over the upper opening 201 of the plating tank 200. A plurality of transfer jigs 30A respectively hold the workpiece 20 that is immersed in the treatment solution contained in the plating tank 200, and are supported by the first guide rail 130 and the second guide rail 140.

Figure 3:
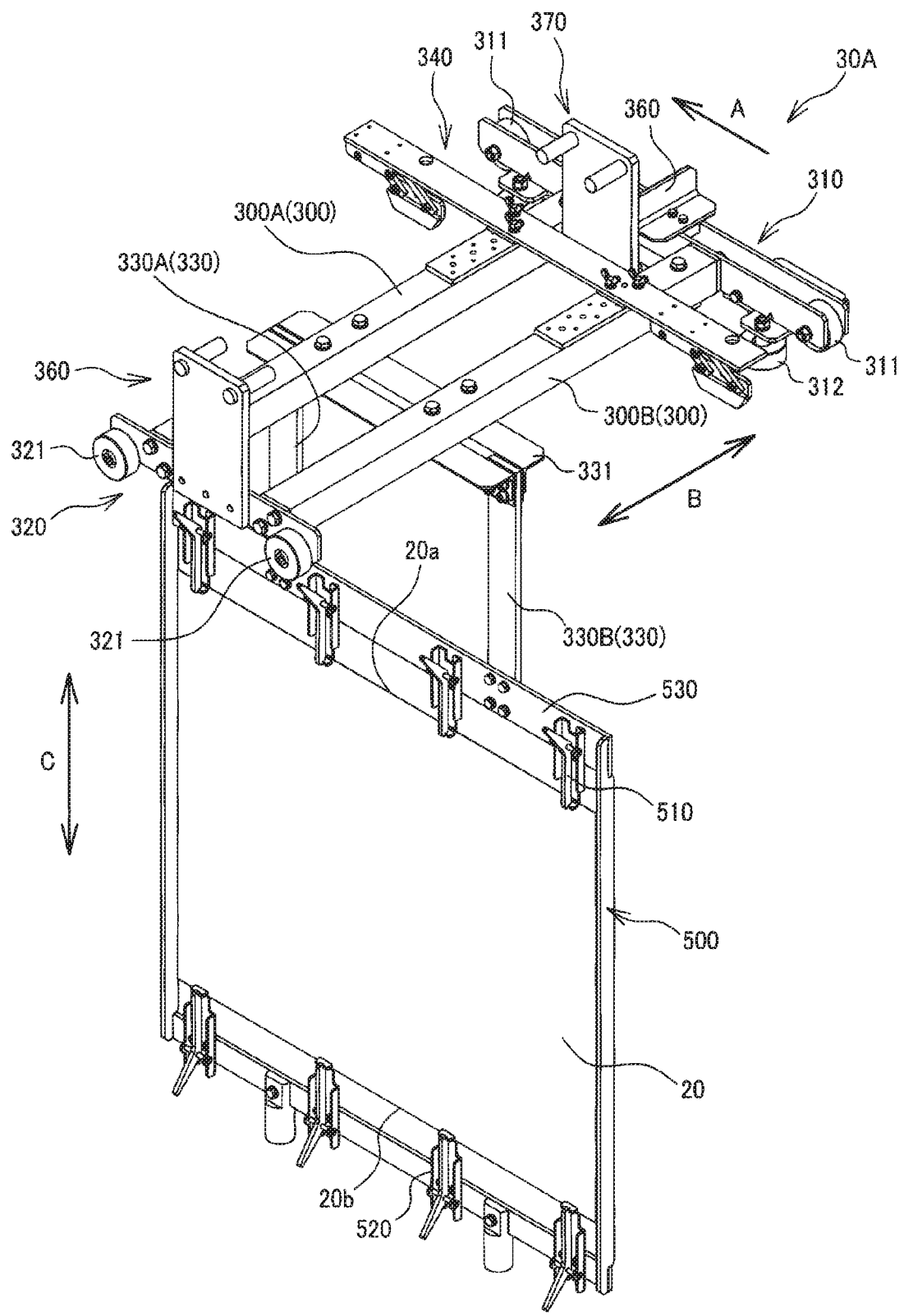
FIG. 3 is a perspective view illustrating a transfer jig.
Figure 4:
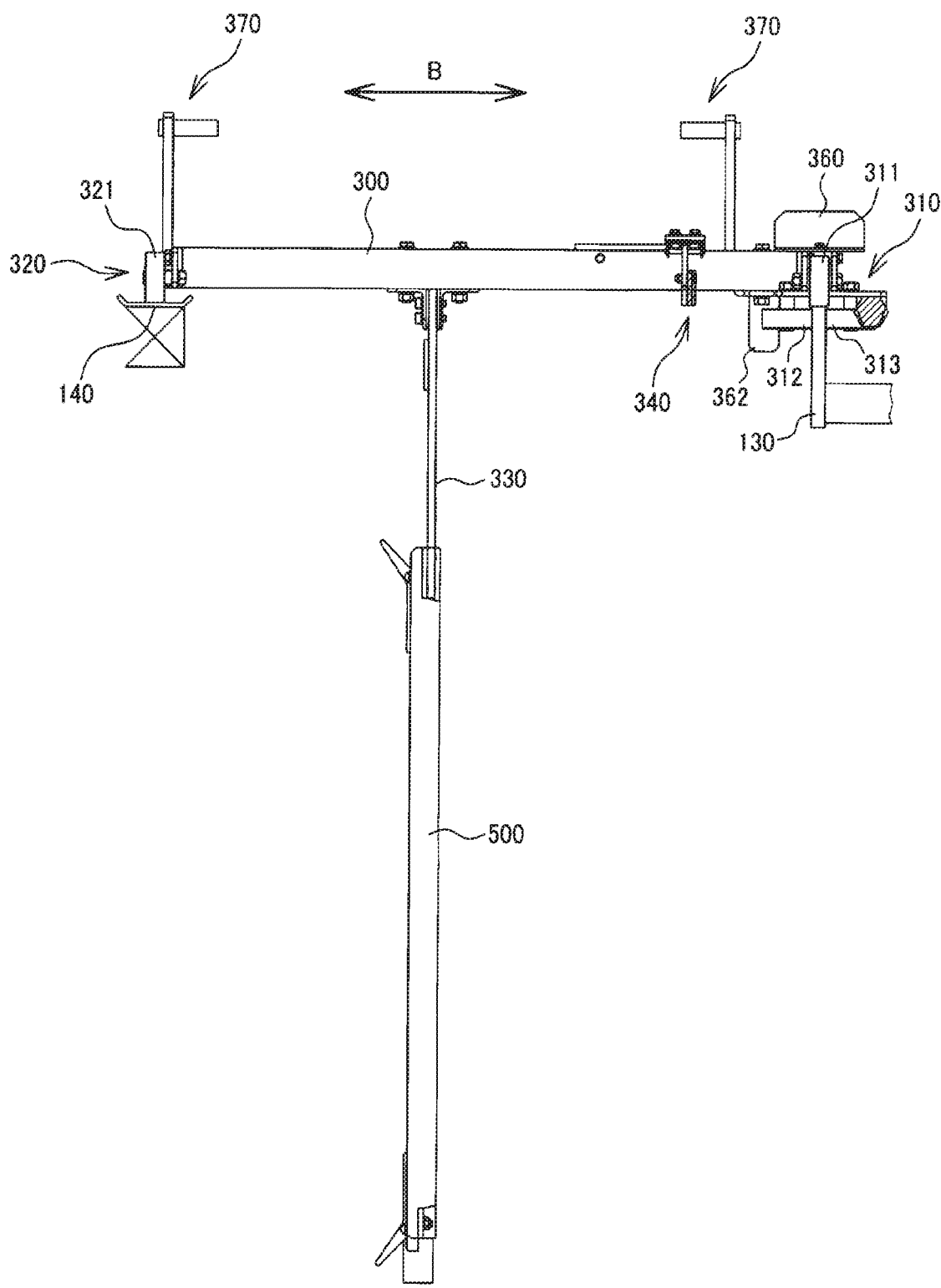
FIG. 4 is a view illustrating two guide rails and a transfer jig.
Figure 5:
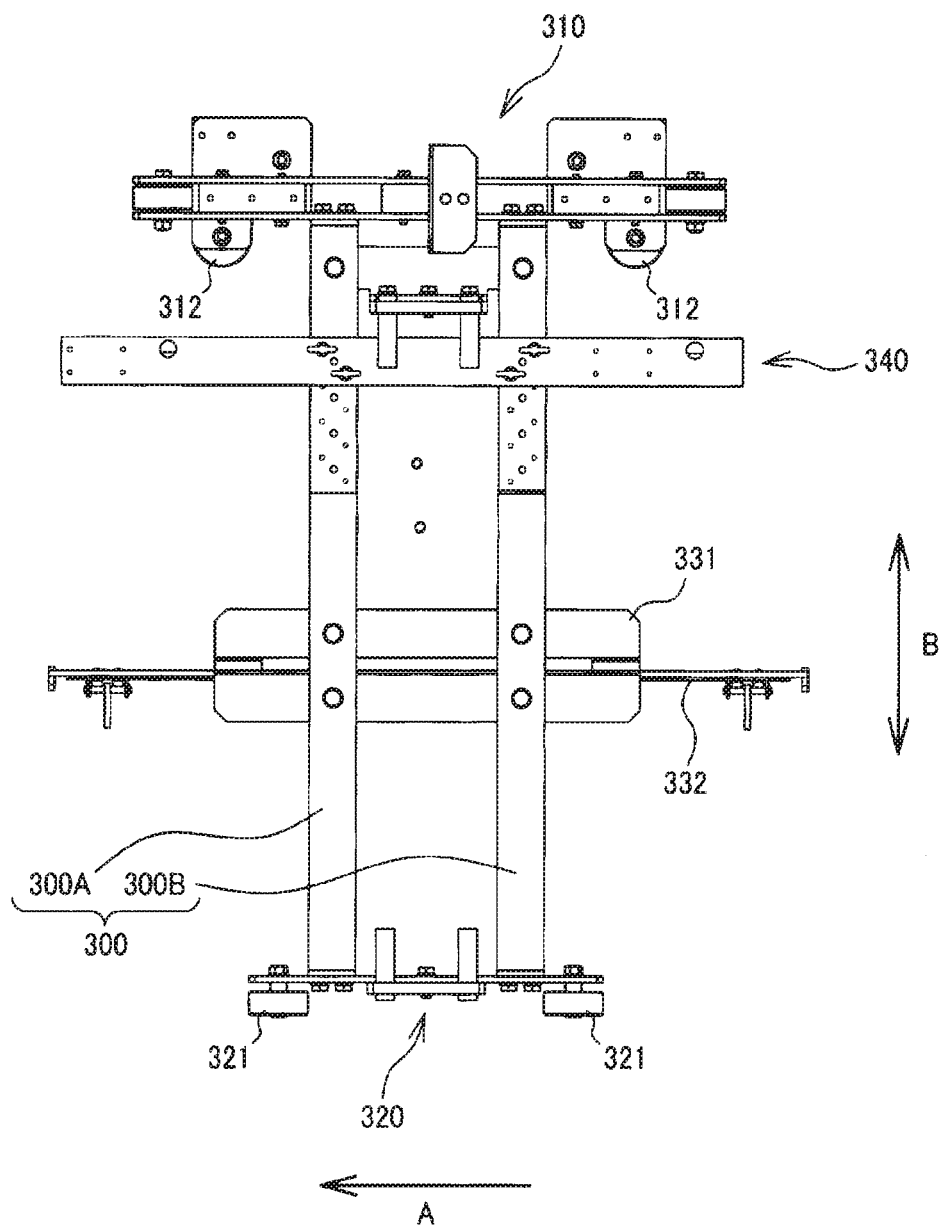
FIG. 5 is a plan view illustrating a transfer jig.
Figure 6:
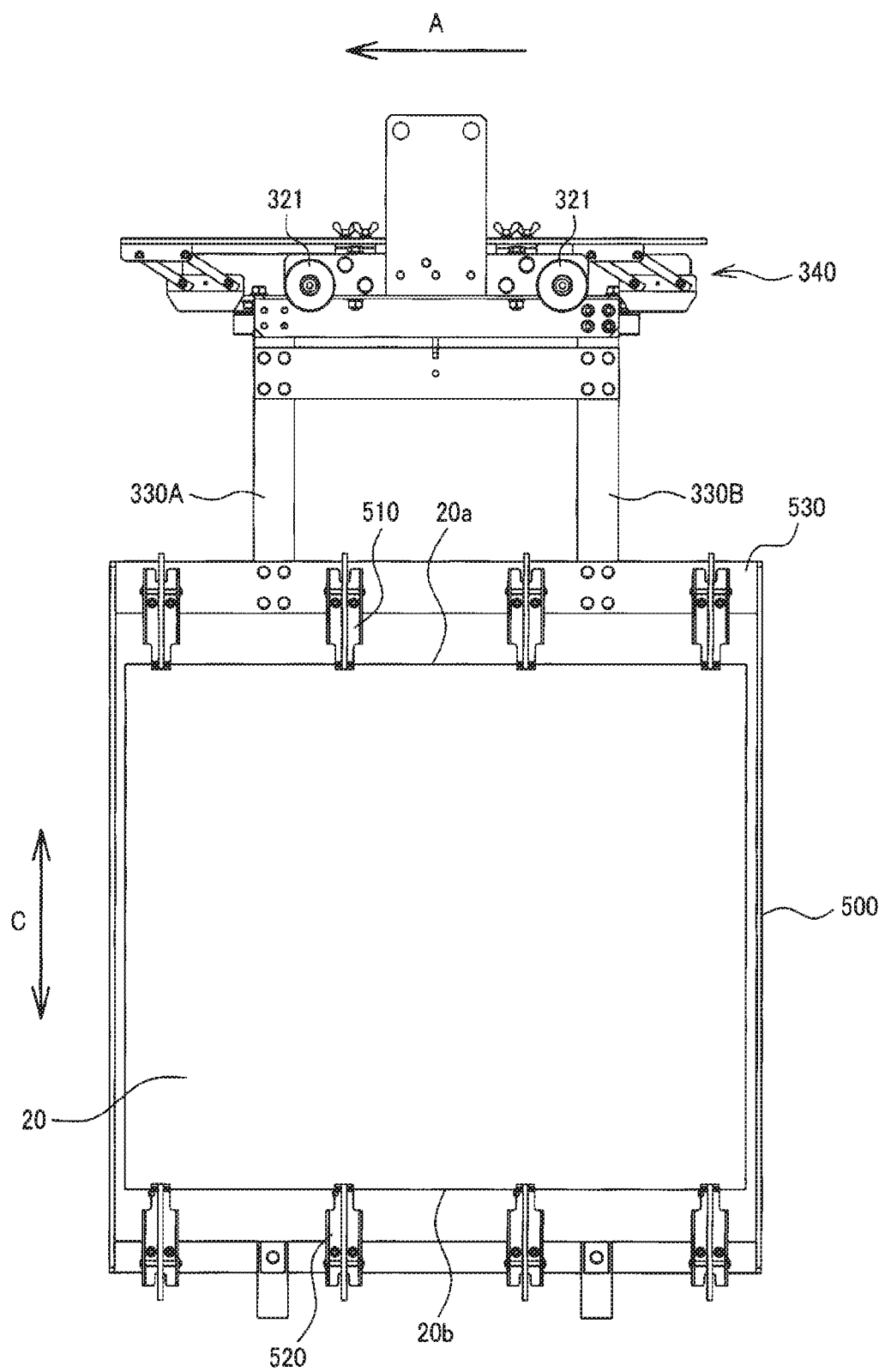
FIG. 6 is a front view illustrating a transfer jig.

As illustrated in FIGS. 3 to 5, each transfer jig 30A includes a horizontal arm section 300, a first guide target section 310, a second guide target section 320, and a vertical arm section 330. As illustrated in FIGS. 3 and 5, the horizontal arm section 300 includes a first horizontal arm 300A and a second horizontal arm 300B that extend along a second direction B that perpendicularly intersects (intersects in a broad sense) the first direction (transfer direction) A, for example. As illustrated in FIG. 4, the first guide target section 310 is supported on one end of the horizontal arm section 300, and is guided by the first guide rail 130. As illustrated in FIG. 4, the second guide target section 320 is supported on the other end of the horizontal arm section 300, and is guided by the second guide rail 140. As illustrated in FIGS. 3 and 6, the vertical arm section 330 includes a first vertical arm 330A and a second vertical arm 330B that are suspended from a support plate 331 secured on the horizontal arm section 300, and hold the workpiece 20 at a position between the first guide target section 310 and the second guide target section 320.

Specifically, each transfer jig 30A has a doubly supported beam configuration in which the first guide target section 310 and the second guide target section 320 positioned on either side of the vertical arm section 330 (that holds the workpiece 20) in the second direction B are supported by the first guide rail 130 and the second guide rail 140. Therefore, the workpiece 20 can be stably held and transferred by suppressing the vertical motion of the transfer jig 30A during transfer as compared with the cantilever configuration disclosed in Japanese Patent No. 3591721. Moreover, since the first guide rail 130, the second guide rail 140, the first guide target section 310, and the second guide target section 320 (i.e., sliding sections) are provided at a position offset from a position over the upper opening 201 of the plating tank 200, it is possible to prevent a situation in which dust or the like falls into the plating tank 200 and contaminates the plating solution.

3. Transfer Jig, Two Guide Rails, and Feed Rail

The plating system 10 is configured so that the workpiece 20 is used as a cathode, and the plating tank 200 is provided with cylindrical mesh bags (receiving sections) 202 and 203 that are positioned on either side of the transfer path of the workpiece 20, and respectively hold anodes (e.g., copper anode balls) 410R and 410L. An electric field is formed between the cathode and the anode to electrolyze the plating solution and electroplate the workpiece 20. Therefore, it is necessary to supply current to the workpiece 20 during transfer. For example, at least one of the first guide rail 130 and the second guide rail 140 may be used as a feed rail in order to supply current to the workpiece 20. In this case, the members of the transfer jig 30A that form a path that supplies current to the workpiece 20 from the first guide rail 130 and the second guide rail 140 may be formed of an electrical conductor.

In one embodiment of the invention, the plating system 10 includes a feed rail 210 in addition to the first guide rail 130 and the second guide rail 140 (see FIGS. 1 and 2). As illustrated in FIG. 2, the feed rail 210 includes a plurality of (e.g., four) split feed rails 210A to 210D that are insulated from each other in order to implement the current control method disclosed in JP-A-2009-132999. Each transfer jig 30A includes a feed target section 340 that comes in contact with one of the split feed rails 210A to 210D and receives current (see FIGS. 2 to 5). The feed target section 340 is disposed at a position between the first guide target section 310 and the vertical arm section 330.

Specifically, each transfer jig 30A has a doubly supported beam configuration in which the first guide target section 310 and the second guide target section 320 positioned on either side of the feed target section 340 in the second direction B are supported by the first guide rail 130 and the second guide rail 140. This makes it possible to stably maintain contact between the feed target section 340 and the feed rail 210 when transferring the transfer jig 30A by suppressing the vertical motion of the feed target section 340.

4. Current Control Method that Utilizes Split Feed Rail

Figure 7:
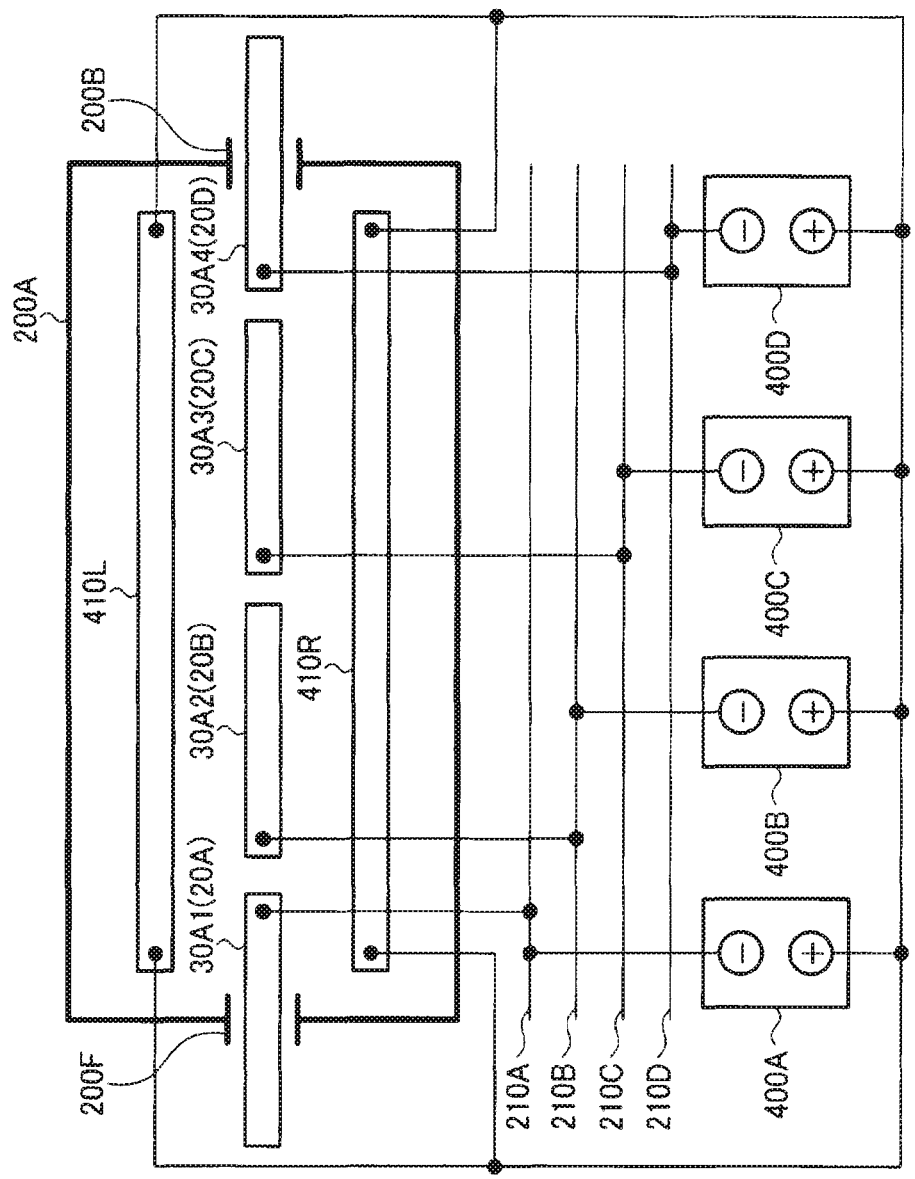
FIG. 7 is a view illustrating an anode current control system.

The current control method disclosed in JP-A-2009-132999 is described below with reference to FIGS. 7, 8A, and 8B. Note that the plating tank 200 illustrated in FIG. 1 has a length equal to or more than about 10 m in the transfer direction perpendicular to the sheet, for example. FIG. 7 illustrates a plating tank unit 200A. The plating tank 200 illustrated in FIG. 1 is formed by connecting a plurality of plating tank units 200A.

Power supply units 400A to 400D supply current to the workpieces 20 during transfer through the corresponding split feed rails 210A to 210D. The power supply units 400A to 400D can supply current to the workpieces 20 having one side Fl and the other side Fr via constant current control at a preset current value ($A/dm^2$). The power supply units 400A to 400D gradually increase the amount of current when the workpiece 20 is transferred to the plating tank unit 200A, and gradually decrease the amount of current when the workpiece 20 is removed from the plating tank unit 200A.

The plating tank unit 200A illustrated in FIG. 7 can simultaneously transfer N (e.g., three) workpieces 20 (20A to 20C or 20B to 20D) in the transfer direction A in a completely immersed state using the transfer jigs 30A (30A1 to 30A4). Note that the term "completely immersed state" used herein refers to a state in which at least the entirety of the plating target surface (side) (i.e., the side Fl and the other side Fr illustrated in FIG. 10) of the workpiece 20 is immersed in a plating solution Q contained in the plating tank unit 200A (see FIGS. 1 and 2). Therefore, (N+1) (i.e., four) workpieces 20 (20A to 20D) are immersed in the plating solution Q contained in the plating tank unit 200A when the workpiece 20A exits from an exit 200B of the plating tank unit 200A, and the workpiece 20D enters an inlet 200F of the plating tank unit 200A.

In this case, the workpieces 20B and 20C are in the completely immersed state, and the workpieces 20A and 20D are in a partially immersed state. Note that the term "partially immersed state" used herein refers to a state in which only part of the plating target surface (side) (i.e., the side Fl and the other side Fr illustrated in FIG. 10) of the workpieces 20A and 20D in the lengthwise (longitudinal) direction is immersed in the plating solution Q contained in the plating tank unit 200A. The area of the workpiece positioned outside the plating tank unit 200A is disposed in the adjacent plating tank unit 200A or another treatment tank.

When the number of workpieces 20 that can be simultaneously transferred in the plating tank unit 200A in the completely immersed state is N (e.g., N=3), the number of split feed rails 210 and the number of power supply units 400 are (N+1) (=4).

As illustrated in FIG. 7, the left and right anodes (copper anode balls) 410L and 410R that extend in the first direction A and are opposite to each other are disposed in the plating tank unit 200A (plating solution Q). The anodes 410L and 410R are common to each workpiece 20 (20A to 20D) held by each transfer jig 30A (30A1 to 30A4). The interval (electrode-electrode distance) between the anodes 410L and 410R and each workpiece 20 during transfer is maintained at a constant value (given value).

The power supply units 400A to 400D can change the current value corresponding to each workpiece 20 held by the transfer jig 30A, and can perform constant current control at a preset current value Is (A/dm$^2$).

More specifically, the power supply units 400A to 400D are configured to perform constant current control in a period in which the workpiece 20 is transferred within the plating tank unit 200A in the completely immersed state, gradually increase the amount of current when the workpiece 20A enters the plating tank unit 200A in the partially immersed state, and gradually decrease the amount of current when the workpiece 20D exits from the plating tank unit 200A in the partially immersed state. The workpiece 20 that is in the partially immersed state in two adjacent plating tank units 200A is subjected to gradual current decrease control in the downstream-side plating tank unit 200A, and is subjected to gradual current increase control in the upstream-side plating tank unit 200A.

Figure 8A:
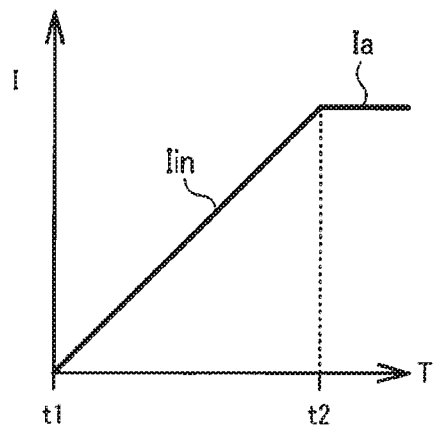
FIGS. 8A and 8B are views illustrating gradual current decrease control when a workpiece exits from a plating tank unit, and gradual current increase control when a workpiece enters a plating tank unit.
Figure 8B:
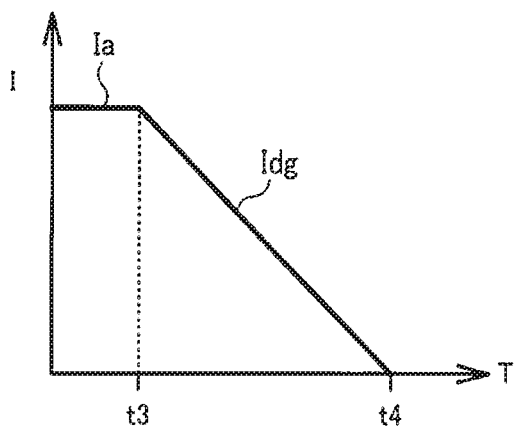

As illustrated in FIG. 8A, the amount of current (Iin) is gradually increased in proportion to the time (treatment area) when the workpiece 20 enters the plating tank unit 200A in the partially immersed state (period T12 (=t1 to t2)) until a preset current value Is is reached. The workpiece 20 is subjected to constant current control at the preset current value Is when the workpiece 20 has been completely immersed (t2). The workpiece 20 is subjected to gradual current decrease control instead of constant current control at the preset current value Is when the workpiece 20 exits from the plating tank unit 200A in the partially immersed state (period T34 (=t3 to t4) (see FIG. 8B). The amount of current (Idg) is gradually decreased in inverse proportion to the time (treatment area).

According to the above configuration, since the serial plating process can be performed using the current value set corresponding to each workpiece 20, a uniform high-quality coating having a uniform thickness corresponding to the current value can be formed on each workpiece 20.

5. Details of Transfer Jig
5.1. Feed Target Section

The feed target section 340 provided to each transfer jig 30A used in one embodiment of the invention comes in contact with one of the N split feed rails 210A to 210D. A plurality of transfer jigs 30A illustrated in FIG. 7 include first to Nth transfer jigs 30A1 to 30A4 in which the feed target section 340 is attached to the horizontal arm section 300 at a different position among N positions in the second direction B. The first to Nth transfer jigs 30A1 to 30A4 respectively come in contact with an arbitrary split feed rail among the N split feed rails 210A to 210D.

According to one embodiment of the invention, the transfer jigs 30A are formed using common parts, and respectively come in contact with an arbitrary split feed rail among the split feed rails 210A to 210D. As illustrated in FIG. 3, each transfer jig 30A (first to Nth transfer jigs 30A1 to 30A4) includes a support section (e.g., support plate 350) that supports the feed target section 340. The support plate 350 includes N (N=4) attachment sections 351 to 354 (e.g., threaded holes) that are provided at a different position in the second direction B.

The feed target section 340 of each transfer jig 30A (first to Nth transfer jigs 30A1 to 30A4 illustrated in FIG. 7) includes a contact section 341 that comes in contact with the feed rail 210 (split feed rails 210A to 210D). The contact section 341 is attached to one (attachment section 351 in FIG. 3) of the N attachment sections 351 to 354 using a thumb screw, for example. The first to Nth transfer jigs 30A1 to 30A4 can be provided using common parts by attaching the contact section 341 to one attachment section selected from the N attachment sections 351 to 354.

Figure 12:
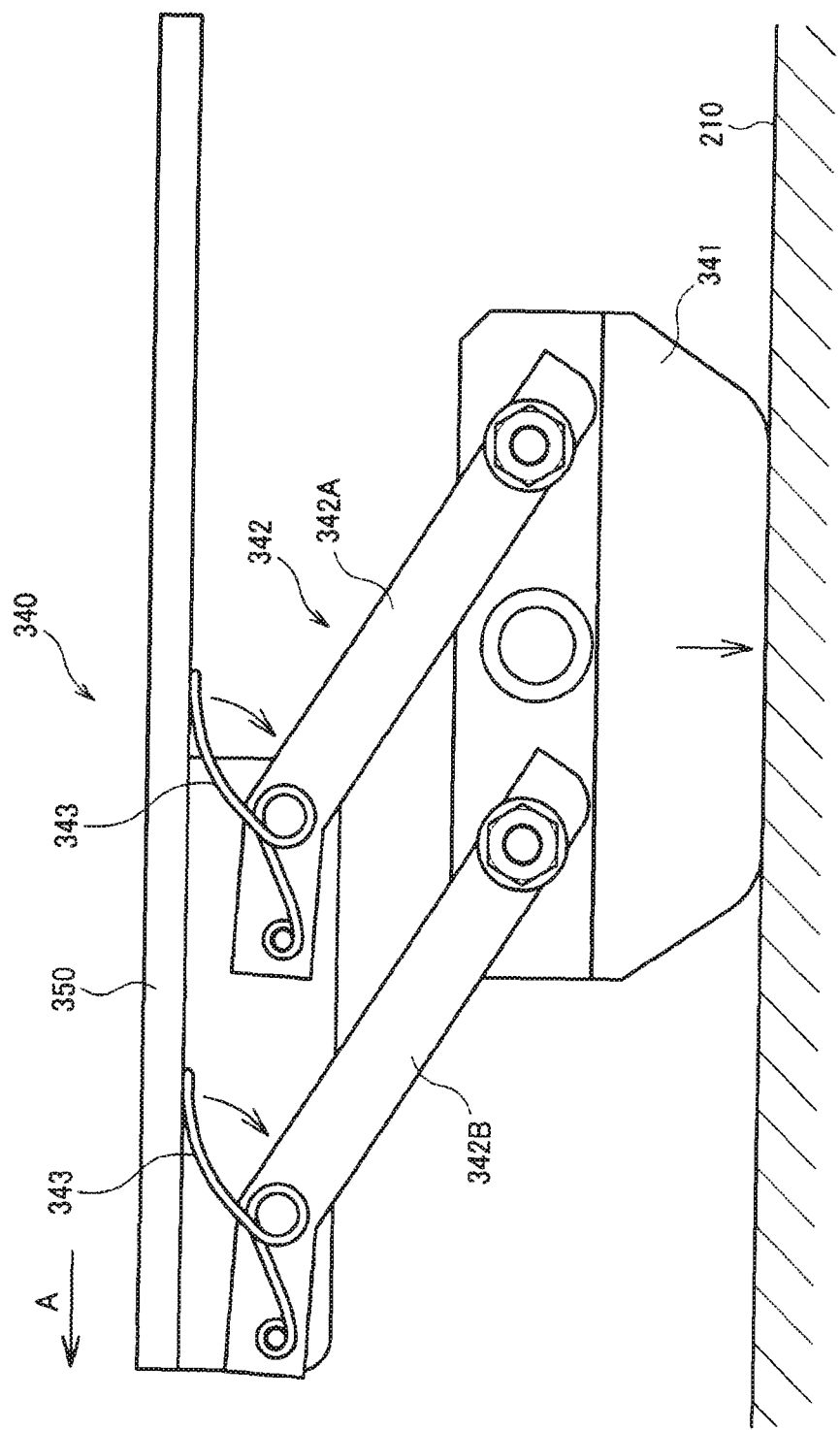
FIG. 12 is a view illustrating the details of a feed target section.

FIG. 12 illustrates the details of the feed target section 340. The feed target section 340 includes a four-bar linkage parallel link mechanism 342 that links the support plate 350 and the contact section 341 using parallel links 342A and 342B, for example. The links 342A and 342B are always biased in the clockwise direction using torsion coil springs 343 (i.e., biasing members). This makes it possible to cause the contact section 341 to come in contact with the feed rail 210 at a moderate contact pressure.

The parallel links 342A and 342B are tilted so that the upper fulcrum precedes the lower fulcrum. In other words, the longitudinal direction of the links 342A and 342B intersects the transfer direction A at an acute angle. Therefore, since the contact section 341 is pulled by the transfer jig 30A, the contact section 341 travels stably. For example, when the contact section 341 that is vertically guided by two vertical shafts is vertically biased in the downward direction using two springs without using the parallel link mechanism 342, the contact section 341 is tilted if the pressing force due to the springs is unbalanced. In this case, the corner of the contact section 341 comes in contact with the feed rail 210, so that the contact section 341 abnormally wears away. According to one embodiment of the invention, the contact section 341 comes in contact with the feed rail 210 in a state in which the contact section 341 is disposed horizontally due to the parallel link mechanism 342. This makes it possible to prevent a situation in which the contact section 341 is tilted so that the corner of the contact section 341 comes in contact with the feed rail 210. Therefore, abnormal wear and connection failure of the contact section 341 are prevented, and the lifetime of the contact section 341 (expendable) can be increased.

Note that the configuration of the feed target section 340 illustrated in FIG. 12 may be applied to a surface treatment system that includes the feed rail 210 in addition to the guide rails 130 and 140. The surface treatment system may include only one guide rail and only one feed rail. When using the guide rail as the feed rail, the feed target section significantly wears away due to excessive pressure applied to the feed target section, so that the lifetime of the feed target section decreases. According to one embodiment of the invention, the feed target section 340 can be caused to come in contact with the feed rail 210 at a moderate contact pressure independently of the travel of the transfer jig 30A. This makes it possible to increase the lifetime of the contact section 341 even if the feed target section 340 is formed of brass or the like.

5.2. First Guide Target Section and Second Guide Target Section

The first guide rail 130 that guides the first guide target section 310 includes an upper side, a first side surface, and a second side surface opposite to the first side surface in a cross section perpendicular to the longitudinal direction. The first guide rail 130 is formed in a rectangular shape, for example.

The first guide target section 310 that is guided by the first guide rail 130 may include a first roller 311 that comes in rolling contact with the upper side of the first guide rail 130, a second roller 312 that comes in rolling contact with the first side surface of the first guide rail 130, and a third roller 313 that comes in rolling contact with the second side surface of the first guide rail 130. The second guide target section 320 may include a fourth roller 321 that comes in rolling contact with the upper side of the second guide rail 140. The first roller 311 and the fourth roller 321 respectively come in contact with the upper side of the first guide rail 130 and the upper side of the second guide rail 140 on either side of the transfer jig 30A in the second direction B, so that the transfer jig 30A can stably travel in a horizontal state. Since the second roller 312 and the third roller 313 hold the side surfaces of the first guide rail 130, it is possible to prevent a situation in which the transfer jig 30A is displaced in the second direction B.

5.3. Continuous Transfer Driver Section

A continuous transfer driver section 150 illustrated in FIG. 2 is provided corresponding to each section obtained by dividing the first linear transfer path 120 (see FIG. 1). The continuous transfer driver section 150 includes pushers 153A and 153B that respectively have linear guides 152A and 152B that move along a fixed guide plate 151. The pushers 153A and 153B are independently moved by a motor (not illustrated in FIG. 2). The transfer jig 30A is continuously and linearly driven by the pushers 153A and 153B within one section. The pushers 153A and 153B respectively have a specific drive region and a common drive region within one section. More specifically, the pusher 153 presses the transfer jig 30A in the upstream-side specific drive region. The pusher 153B succeeds the pusher 153A when continuously transferring the transfer jig 30A in the common drive region. The pusher 153A moves forward by a given stroke in the specific drive region and the common drive region, moves backward to the previous position, and transfers the subsequent transfer jig 30A. The pusher 153B operates in the same manner as the pusher 153A.

The pushers 153A and 153B respectively have nail members 154A and 154B that press a first press target section 360 of the transfer jig 30A. The nail members 154A and 154B press the first press target section 360 of the transfer jig 30A when the pushers 153A and 153B move forward. The nail members 154A and 154 B can be displaced so as not to hinder the forward movement of the first press target section 360 when the pushers 153A and 153B move backward. Note that the transfer jig 30A includes a second press target section 362 that is used when the workpiece is not continuously transferred in the plating tank 20.

5.4. Hook Section

As illustrated in FIGS. 1 to 5, each transfer jig 30A includes hook sections 370 for suspending the transfer jig 30A. As illustrated in FIG. 1, the serial plating system 10 further includes a lift section 160 that engages the hook sections 370, and moves the workpiece 20 held by the transfer jig 30A upward and downward relative to the plating tank 200.

This makes it unnecessary to use a vertical rail when moving the workpiece upward and downward outside the plating tank 200, and makes it possible to reduce the driving force.

5.5. Vertical Arm Section and Workpiece-Holding Jig

As illustrated in FIGS. 3 and 6, the vertical arm section 330 includes the vertical arms 330A and 330B, for example. The workpiece-holding jig 500 is suspended from the vertical arms 330A and 330B.

The workpiece-holding jig 500 is suitably used to hold a very thin workpiece 20 having a thickness of 100 micrometers or less, and preferably 60 micrometers or less. In one embodiment of the invention, the thickness of the workpiece 20 is 40 micrometers (=0.04 mm), for example.

As illustrated in FIGS. 3 and 6, the workpiece-holding jig 500 includes a plurality of first chuck members 510 that hold a first side (e.g., upper side) 20a of a rectangular workpiece 20, a plurality of second chuck members 520 that hold a second side 20b of the rectangular workpiece 20 opposite to the first side in a third direction (vertical direction) C, and a frame-like member 530 that is disposed to surround the rectangular workpiece 20, and supports the first chuck members 510 and the second chuck members 520.

Figure 10:
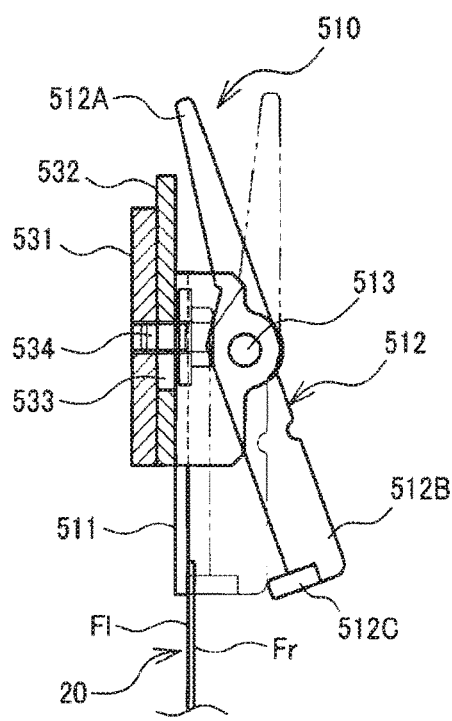
FIG. 10 is a view illustrating a state in which a workpiece is held by moving a movable plate downward.
Figure 11:
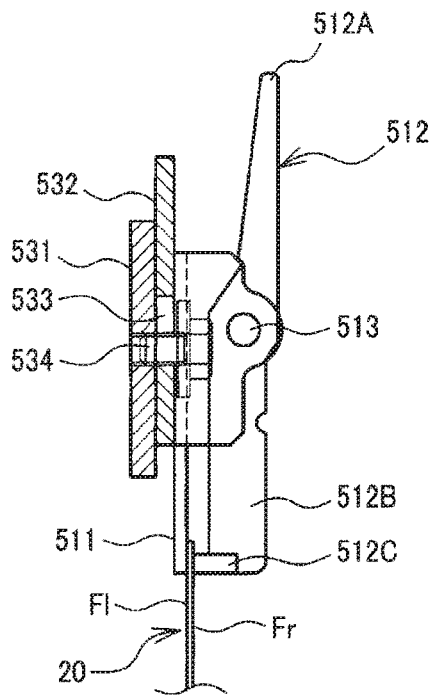
FIG. 11 is a view illustrating a state in which tension is applied to a workpiece by supporting the workpiece using a first chuck member.

As illustrated in FIGS. 9 to 11, the frame-like member 530 includes a guide section 540 that guides the first chuck members 510 so that the first chuck members 510 are movable in the third direction C, and a coil spring 550 (i.e., biasing member) that biases the first chuck members 510 in a direction C1 in which the first chuck members 510 move away from the second chuck members 520 along the first direction.

As illustrated in FIGS. 10 and 11, the frame-like member 530 includes a stationary plate 531, and a movable plate 532 that is disposed to overlap the stationary plate 531. The guide section 540 has a long hole 533 that is formed in one (e.g., movable plate 532) of the stationary plate 531 and the movable plate 532, and extends in the third direction C, and a shaft (e.g., bolt shaft 534) that is formed on the other of the stationary plate 531 and the movable plate 532, and is inserted into the long hole 533. The coil spring 550 presses (biases) the movable plate 532 in the direction C1 relative to the stationary plate 531.

A configuration common to the first chuck members 510 and the second chuck members 520 is described below with reference to FIGS. 10 and 11 taking the first chuck member 510 as an example. The first chuck member 510 includes a stationary member 511 that comes in contact with the first side Fl of the workpiece 20, and a movable member 512 that is disposed at a position opposite to the stationary member 511 so as to come in and out of contact with the second side Fr of the workpiece 20, and is pressed against the second side Fr. The movable member 512 may include a driven element 512A that is driven when the movable member 512 is not pressed against the second side Fr, a pressed element 512B that is always pressed toward the stationary member 511 via a hinge 513 due to spring pressure when the driven element 512A is not driven, and a pressing element 512C that is formed in the shape of a thin plate at the free end of the pressed element 512B.

When attaching the workpiece 20 to the workpiece-holding jig 500, the second side 20b of the workpiece 20 is held using the second chuck members 520. When holding the first side 20a of the workpiece 20 using the first chuck members 510, the movable plate 532 is moved downward to the position (state) illustrated in FIG. 10 against the biasing force of the coil spring 550. In this case, the pressed element 512B is set to an open state (see FIG. 10) by driving the driven element 512A of each first chuck member 510. The driven element 512A is then released, so that the first side 20a of the workpiece 20 is held by the first chuck members 510. The downward pressing force applied to the movable plate 532 is then canceled. As a result, the movable plate 532 moves upward due to the biasing force of the coil spring 550, and applies tension to the workpiece 20, so that the planarity of the workpiece 20 can be maintained.

Note that tension may be applied to the workpiece 20 using at least either the first chuck members 510 or the second chuck members 520. Specifically, the second chuck members 520 may have the above tension-applying structure.

The workpiece-holding jig 500 having the above structure may be used for a batch process that simultaneously immerses a plurality of workpiece-holding jigs 500 in the treatment solution. In this case, the first chuck members 510 and the second chuck members 520 may be disposed on the right side and the left side instead of the upper side and the lower side.

5.6. Current-Carrying Section and Workpiece Holding Section Illustrated in FIG. 3

As illustrated in FIG. 3, the current-carrying section of the workpiece-holding jig 30A includes the conductive horizontal arm section 300, the conductive support plate 331, and the conductive vertical arm sections 330A and 330B (330). A workpiece-holding section 500 is suspended from the vertical arms 330A and 330B.

As illustrated in FIG. 3, the workpiece-holding section 500 includes a plurality of conductive first chuck members 510 that hold the upper side 20a of the rectangular workpiece 20, a plurality of conductive second chuck members 520 that hold the lower side 20b of the rectangular workpiece 20 opposite to the upper side 20a in the vertical direction C, and a frame-like member 530 that is disposed to surround the rectangular workpiece 20, and supports the first chuck members 510 and the second chuck members 520.

The frame-like member 530 includes a conductive upper frame member 531 that supports a plurality of first chuck members 510, a conductive lower frame member 532 that supports a plurality of second chuck members 520, and two conductive vertical frame members 533 and 534 that connect either end of the upper frame member 531 and either end of the lower frame member 532.

The frame-like member 530 illustrated in FIG. 3 is thus configured so that the upper frame member 531 and the lower frame member 532 are electrically connected via the vertical frame members 533 and 534. The vertical arm sections 332A and 332B that function as a current-carrying section are electrically connected to the lower frame member 532 via the upper frame member 531. Therefore, the resistance of the current-carrying path that reaches the lower frame member 532 is inevitably higher than the resistance of the current-carrying path that reaches the upper frame member 531. Accordingly, the workpiece 20 has a current distribution with poor in-plane uniformity in which the current valve increases as the distance from the upper side 20a decreases, and decreases as the distance from the lower side 20b decreases.

Figure 13:
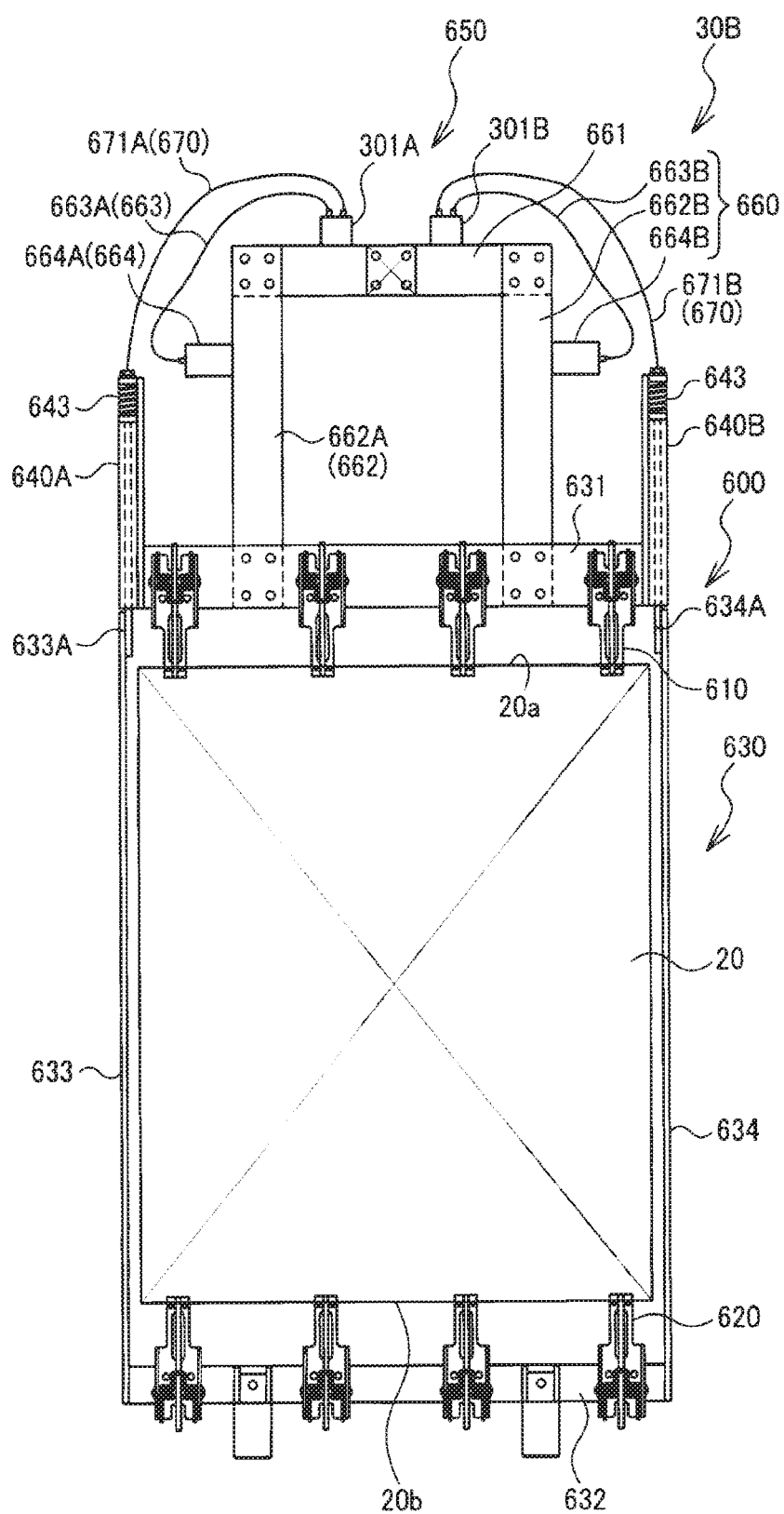
FIG. 13 is a front view illustrating a current-carrying section and a workpiece-holding section of a workpiece-holding jig according to another embodiment of the invention.
Figure 14:
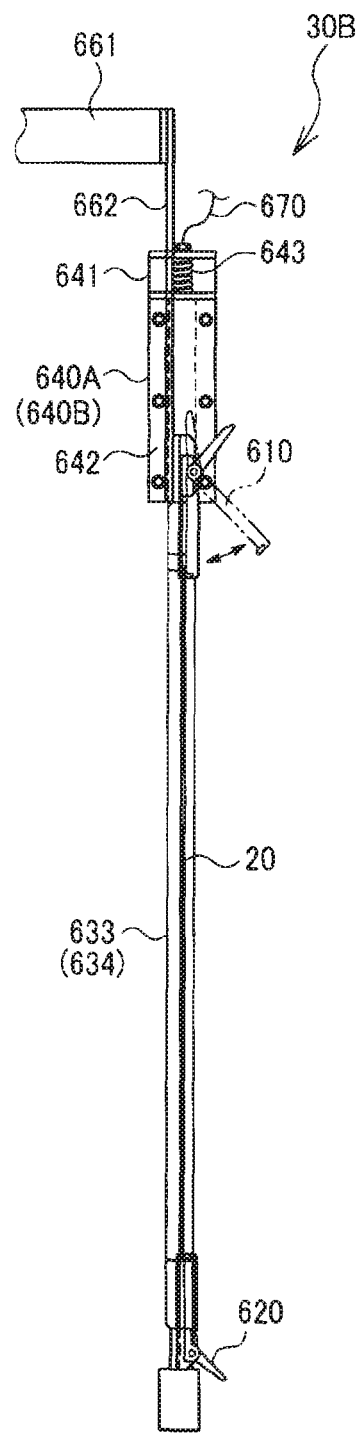
FIG. 14 is a side view illustrating the workpiece-holding jig illustrated in FIG. 13.

6. Modification of Workpiece-Holding Section of Workpiece-Holding Jig 6.1. First Chuck Member, Second Chuck Member, First Current-Carrying Section, and Second Current-Carrying Section FIGS. 13 and 14 illustrate a workpiece-holding jig 30B according to one embodiment of the invention. FIGS. 13 and 14 illustrate a workpiece-holding section 600 having a configuration differing from that of the workpiece-holding jig 30A illustrated in FIG. 3. Note that the transfer section 300 illustrated in FIG. 3 can be used in common to the workpiece-holding jig 30A illustrated in FIG. 3 and the workpiece-holding jig 30B according to one embodiment of the invention. The workpiece-holding jig 30B illustrated in FIG. 13 differs from the workpiece-holding jig 30A illustrated in FIG. 3 as to the structure of the workpiece-holding section 600 including a current-carrying section 650.

The workpiece-holding section 600 illustrated in FIG. 13 includes a plurality of conductive first chuck members 610 that hold the upper side 20a of the rectangular workpiece 20, a plurality of conductive second chuck members 620 that hold the lower side 20b of the rectangular workpiece 20, a frame-like member 630 that is disposed to surround the rectangular workpiece 20, and supports the first chuck members 610 and the second chuck members 620, and the current-carrying section 650 that includes a first current-carrying section 660 and a second current-carrying section 670.

The first chuck members 610 and the second chuck members 620 are electrically insulated. The first current-carrying section 660 supplies current to the first chuck members 610. The second current-carrying section 670 supplies current to the second chuck members 620.

When subjecting a very thin workpiece to surface treatment, it may be difficult to maintain the suspended state of the workpiece 20 due to liquid pressure when placing the workpiece 20 in the surface treatment tank 200 by moving the workpiece 20 downward, or when transferring the workpiece 20 in the surface treatment tank 200 in the transfer direction A (see FIG. 3).

Since the workpiece-holding section 600 according to one embodiment of the invention holds the upper side 20a and the lower side 20b of the workpiece 20, it is possible to maintain the workpiece 20 in a vertical state even if liquid pressure is applied. The distance between the first chuck members 610 and the second chuck members 620 may be fixed. Note that the second chuck members 620 may be movable in the vertical direction, and may be vertically biased in the downward direction using a biasing member (described later).

The workpiece-holding section 600 according to one embodiment of the invention can prevent deformation of a very thin workpiece 20 having a thickness of 100 micrometers or less, and preferably 60 micrometers or less. In one embodiment of the invention, the thickness of the workpiece 20 is 40 micrometers (=0.04 mm), for example. Since the workpiece-holding section 500 illustrated in FIG. 3 includes the first chuck members 510 and the second chuck members 520, the workpiece-holding section 500 can also prevent deformation of the workpiece 20.

However, when the frame-like member 530, the first chuck members 510, and the second chuck members 520 are electrically connected as described above (see FIG. 3), the resistance of the current-carrying path that reaches the lower frame member 532 that supports the second chuck members 520 is inevitably higher than the resistance of the current-carrying path that reaches the upper frame member 531 that supports the first chuck members 510. This is because the current-carrying path that reaches the lower frame member 532 passes through the current-carrying path that reaches the upper frame member 531. When holding only the upper side (end) of the workpiece using the holding jig (see JP-A-2009-132956), the current-carrying path is limited to the upper frame member. Therefore, the flow of current from the anode to the workpiece and the frame-like member via the treatment solution (or the flow of current in the reverse direction) more easily occurs on the upper side of the workpiece that is held by the workpiece-holding jig, so that the in-plane current distribution of the workpiece becomes non-uniform.

The in-plane uniformity of the current distribution of the workpiece affects the surface treatment quality of the workpiece.

The workpiece-holding section 600 according to one embodiment of the invention is configured so that the first chuck members 610 and the second chuck members 620 are electrically insulated, and current is supplied to the first chuck members 610 and the second chuck members 620 through the first current-carrying section 660 and the second current-carrying section 670, respectively. Therefore, the resistance of the current-carrying path from the first current-carrying section 660 to the first chuck members 610 and the resistance of the current-carrying path from the second current-carrying section 670 to the second chuck members 620 can be set independently. This makes it possible to improve the in-plane uniformity of the current distribution of the workpiece 20, and further improve the surface treatment quality of the workpiece 20.

6.2. Frame-Like Member and Current-Carrying Section

The frame-like member 630 of the workpiece-holding section 600 according to one embodiment of the invention may include a conductive upper frame member 631 that supports the first chuck members 610, a conductive lower frame member 632 that supports the second chuck members 620, two insulating members 640A and 640B that are provided on either end of the upper frame member 631, and two conductive vertical frame members 633 and 634, the upper end of the vertical frame members 633 and 634 being respectively supported by the insulating members 640A and 640B, and the lower end of the vertical frame members 633 and 634 being connected to either end of the lower frame member 632.

In this case, the first current-carrying section 660 supplies current to the first chuck members 610 via the upper frame member 631. The second current-carrying section 670 supplies current to the second chuck members 620 via the vertical frame members 633 and 634 and the lower frame member 632. Since the upper frame member 631 and the vertical frame members 633 and 634 are electrically insulated by the insulating members 640 and 640B, the resistance of each current-carrying path can be set independently.

The current-carrying section 650 may utilize horizontal arm sections 301 (301A, 301B) of the transfer section 300 as a common current-carrying section that supplies current to the upper frame member 631 and the lower frame member 632. The first current-carrying section 660 supplies current to the first chuck members 610 from the common current-carrying section 301 (301A, 301B) via the upper frame member 631. The second current-carrying section 670 supplies current to the second chuck members 620 from the common current-carrying section 301 (301A, 301B) via the vertical frame members 633 and 634 and the lower frame member 632.

The workpiece-holding jig 30A includes the transfer section 300 and the current-carrying section 330. The horizontal arm section 301 (301A, 301B) provided as the conductive member 300 may be used as the common current-carrying section. Moreover, since the common current-carrying section 301 (301A, 301B) can be used as a support section that supports the frame-like member, the number of parts can be reduced.

In this case, the first current-carrying section 660 may include an insulating section 661 that is secured on the common current-carrying section 301 (301A, 301B), a conductive connection section 662 that connects the insulating section 661 and the upper frame member 631, and at least one upper frame current-carrying cable 663 that connects the common current-carrying section 301 (301A, 301B) and the connection section. The second current-carrying section 670 may include a first vertical frame current-carrying cable 671A and a second vertical frame current-carrying cable 671B that connect the common current-carrying section 301 (301A, 301B) and the vertical frame members 633 and 634, respectively.

According to the above configuration, the conductive member provided as the transfer section 300 among the functional sections (transfer section 300 and workpiece-holding section 600) of the workpiece-holding jig 30B can be used as the common current-carrying section 301 (301A, 301B), and the common current-carrying section 301 (301A, 301B) can be used as a support section that supports the frame-like member 630, so that the number of parts can be reduced. Moreover, since the first current-carrying section 660 includes the conductive connection section 662 that connects the insulating section 661 secured on the common current-carrying section 301 (301A, 301B) with the upper frame member 631, the first current-carrying section 660 can also be used as a support section that supports the frame-like member 630. Therefore, the number of parts can be reduced. The current-carrying paths from the common current-carrying section 301 (301A, 301B) can be separately provided using at least one upper frame current-carrying cable 663, the first vertical frame current-carrying cable 671A, and the second vertical frame current-carrying cable 671B.

The connection section 662 may include a first vertical arm section 662A and a second vertical arm section 662B that connect the insulating section 661 and the upper frame member 631, a first protrusion section 664A that protrudes from the first vertical arm section 662A, and a second protrusion section 664B that protrudes from the second vertical arm section 662B. In this case, at least one upper frame current-carrying cable 663 may include a first upper frame current-carrying cable 663A that connects the horizontal arm section 301A (one of the common current-carrying sections) and the first protrusion section 664A, and a second upper frame current-carrying cable 663B that connects the horizontal arm section 301B (the other of the common current-carrying sections) and the second protrusion section 664B.

When providing the first protrusion section 664A and the second protrusion section 664B in addition to the first vertical arm section 662A and the second vertical arm section 662B having a connection function, the first protrusion section 664A and the second protrusion section 664B function as a redundant section that increases the current-carrying path of the first current-carrying section 660. More specifically, one of the first vertical frame current-carrying cable 671A and the second vertical frame current-carrying cable 671B (i.e., second current-carrying section 670) and one of the vertical frame members 633 and 634 form a current-carrying path between the common current-carrying section 301 and the lower frame member 632. Since the vertical frame member 632 is relatively long, and must be reduced in cross-sectional area in order to reduce the weight, the vertical frame member 632 has a relatively high resistance. Therefore, the first current-carrying section 660 is provided with a relatively high resistance using one of the first vertical arm section 662A and the second vertical arm section 662B and one of the first protrusion section 664A and the second protrusion section 664B so that a balance with the relatively high resistance of the vertical frame member 632 is achieved. If a balance with the relatively high resistance of the vertical frame member 632 can be achieved, it is possible to use cables that are identical in length and cross-sectional area of the current-carrying section as the first upper frame current-carrying cable 663A, the second upper frame current-carrying cable 663B, the first vertical frame current-carrying cable 671A, and the second vertical frame current-carrying cable 671B. This makes it possible to reduce the frequency of erroneous installation.

The resistance of the current path from the common current-carrying section 301 to the upper frame member 631 and the resistance of the current path from the common current-carrying section 301 to the lower frame member 632 can be made substantially equal by utilizing the workpiece-holding section 600 and the current-carrying section 650 having the above structure. This makes it possible to improve the in-plane uniformity of the current distribution of the workpiece 20, and further improve the surface treatment quality of the workpiece 20.

6.3. Structure that Maintains Workpiece in Vertical State

Figure 15:
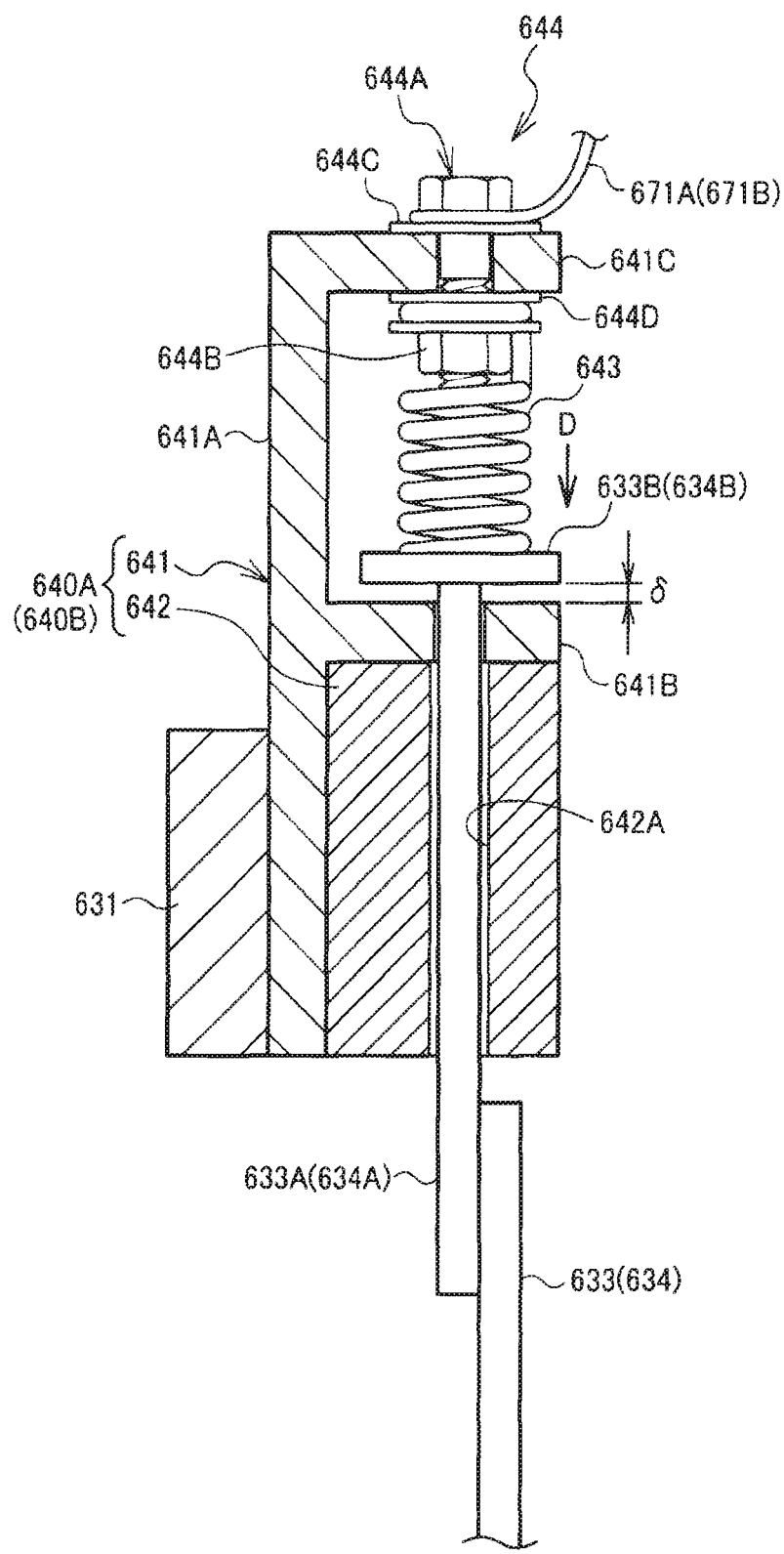
FIG. 15 is a view illustrating an insulating member that guides a vertical frame member, and a biasing member that biases the vertical frame member.

As illustrated in FIG. 15, each of the insulating members 640A and 640B may include a guide section 642A that slidingly guides an upper end 633A or 634A of the vertical frame member 633 or 634 in the vertical direction. According to the above configuration, the weight of the vertical frame members 633 and 634, the lower frame member 632, and the second chuck members 620 is applied to the lower end of the workpiece 20 that is supported by the first chuck members 610 on the upper end, so that the workpiece 20 can be held (maintained) in a vertical state due to tension. Therefore, deformation of the workpiece 20 can be prevented even if liquid pressure is applied to the workpiece 20 in the surface treatment tank.

Each of the insulating members 640A and 640B may include a stationary section 641 that is secured on either end of the upper frame member 631, and a tubular body 642 that is secured on the stationary section 641, and a hole 642A may serve as the guide section that slidingly guides the upper end 633A or 634A of the vertical frame member 633 or 634 in the vertical direction. Note that the stationary section 641 and the tubular body 642 may be integrally formed. The stationary section 641 may include a vertical element 641A that is secured on the upper frame member 631, and two horizontal elements 641B and 641C, for example. The tubular body 642 may be secured on the vertical element 641A and the horizontal element 641B right under the horizontal element 641B. A flange 633B or 634B provided on the upper end 633A or 634A of the vertical frame member 633 or 634 comes in contact with the horizontal element 641B (i.e., lower-limit stopper). A clearance 6 is formed between the flange 633B or 634B and the horizontal element 641B during normal use in which the workpiece 20 is held. The workpiece 20 is held in a vertical state due to the weight of each member as long as the clearance 6 is formed.

As illustrated in FIG. 15, a biasing member (e.g., compression coil spring 643) that biases the vertical frame member 633 or 634 that is slidingly guided by the guide section 642A in a downward direction D, may be further provided. According to the above configuration, the biasing force of the biasing member 643 is applied to the lower end of the workpiece 20 that is supported by the first chuck members 610 on the upper end in addition to the weight of the vertical frame members 633 and 634, the lower frame member 632, and the second chuck members 620, so that the workpiece 20 can be held (maintained) in a vertical state due to additional tension.

The lower end of the biasing member 634 may be secured on the flange 633B (634B) of the vertical frame member 633 or 634 that is slidingly guided by the guide section 642A, for example.

The upper end of the biasing member 643 is secured on a conductive stationary member 644 that is supported by the horizontal element 641C of the insulating member 640A (640B). The vertical frame current-carrying cable 671A (671B) may be connected to the stationary member 644.

The vertical frame current-carrying cable 671A (671B) thus supplies current to the vertical frame member 633 (634) via the stationary member 644 and the biasing member 643.

As illustrated in FIG. 15, the stationary member 644 may include a bolt 644A, a nut 644B, and two metal washers 644C and 644D, for example. The vertical frame current-carrying cable 671A (671B) is fastened and held between the head of the bolt 644A and the washer 644C at a position above the horizontal element 641C. The upper end of the compression coil spring 643 is fastened and held between the nut 644B and the washer 644D at a position right under the horizontal element 641C. The vertical frame current-carrying cable 671A (671B) and the biasing member 643 are thus secured and electrically connected.

Note that the vertical frame current-carrying cable 671A (671B) may be connected directly to the vertical frame member 633 (634) without using the stationary member 644 and the biasing member 643. For example, a liquid surface Q1 (see FIG. 16) of the treatment solution Q is positioned between the upper side 20a of the workpiece 20 and the upper frame member 631 (see FIG. 13). The vertical frame current-carrying cable 671A (671B) may be connected directly to the vertical frame member 633 (634) at a position above the liquid surface Q1. In this case, the biasing member (compression coil spring) 643 illustrated in FIGS. 13 to 15 may be disposed between the horizontal element 641 and the flange 633B (634B), and need not form a current-carrying path.

7. Anode that Improves in-Plane Uniformity of Current Distribution of Workpiece

Figure 16:
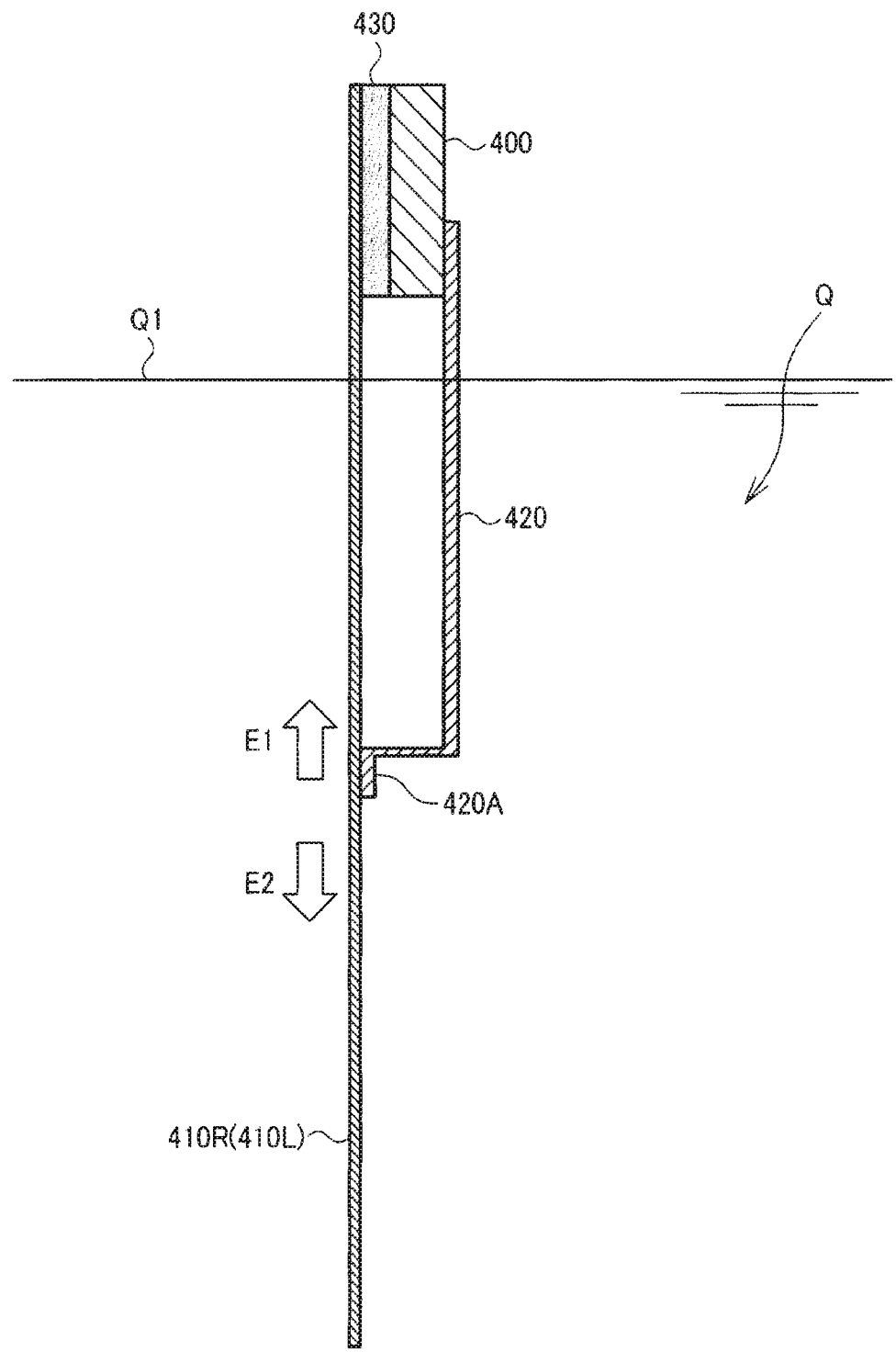
FIG. 16 is a schematic view illustrating an anode that is disposed in a treatment tank illustrated in FIG. 1.

FIG. 16 schematically illustrates the anode (anode) 410R (410L) that is disposed on either side of the transfer path of the workpiece 20 (see FIG. 1). Current is supplied to the anode 410R (410L) from an anode bar 400 that extends along the longitudinal direction of the treatment tank 200. The anode 410R (410L) is normally connected directly to the anode bar 400. In one embodiment of the invention, however, the anode 410R (410L) is secured on the anode bar 400 in a state in which an insulator 430 is interposed between the anode bar 400 and the anode 410R (410L). A relay current-carrying section 420 is suspended from the anode bar 400. A contact member 420A at the lower end of the relay current-carrying section 420 is provided at a position lower than the liquid surface Q1 of the treatment solution Q contained in the treatment tank 200. The contact member 420A is connected to the anode 410R (410L) at a middle position in the vertical direction, and supplies current to the anode 410R (410L), for example.

The contact member 420A is preferably connected to the anode 410R (410L) at a position in the vertical direction that halves the vertical dimension of the workpiece 20 that is suspended from the workpiece-holding jig 30B. When using a plurality of types of workpiece 20 that differ in vertical dimension, the vertical position of the contact member 420A may be adjusted by utilizing a well-known drive mechanism as the relay current-carrying section 420. Note that the contact member 420A may come in contact with the anode 410R (410L) over a given length in the direction perpendicular to the sheet.

Current supplied from the contact member 420 flows through the anode 410R (410L) in an upward direction E1 and a downward direction E2 from the position of the contact member 420 when flowing toward the workpiece 20 (i.e., cathode) through the treatment solution contained in the treatment tank 200. Therefore, current flows through the workpiece 20 to implement an improved (uniform) current distribution in the vertical direction.

8. Evaluation of in-Plane Uniformity of Current Distribution

Figure 17:
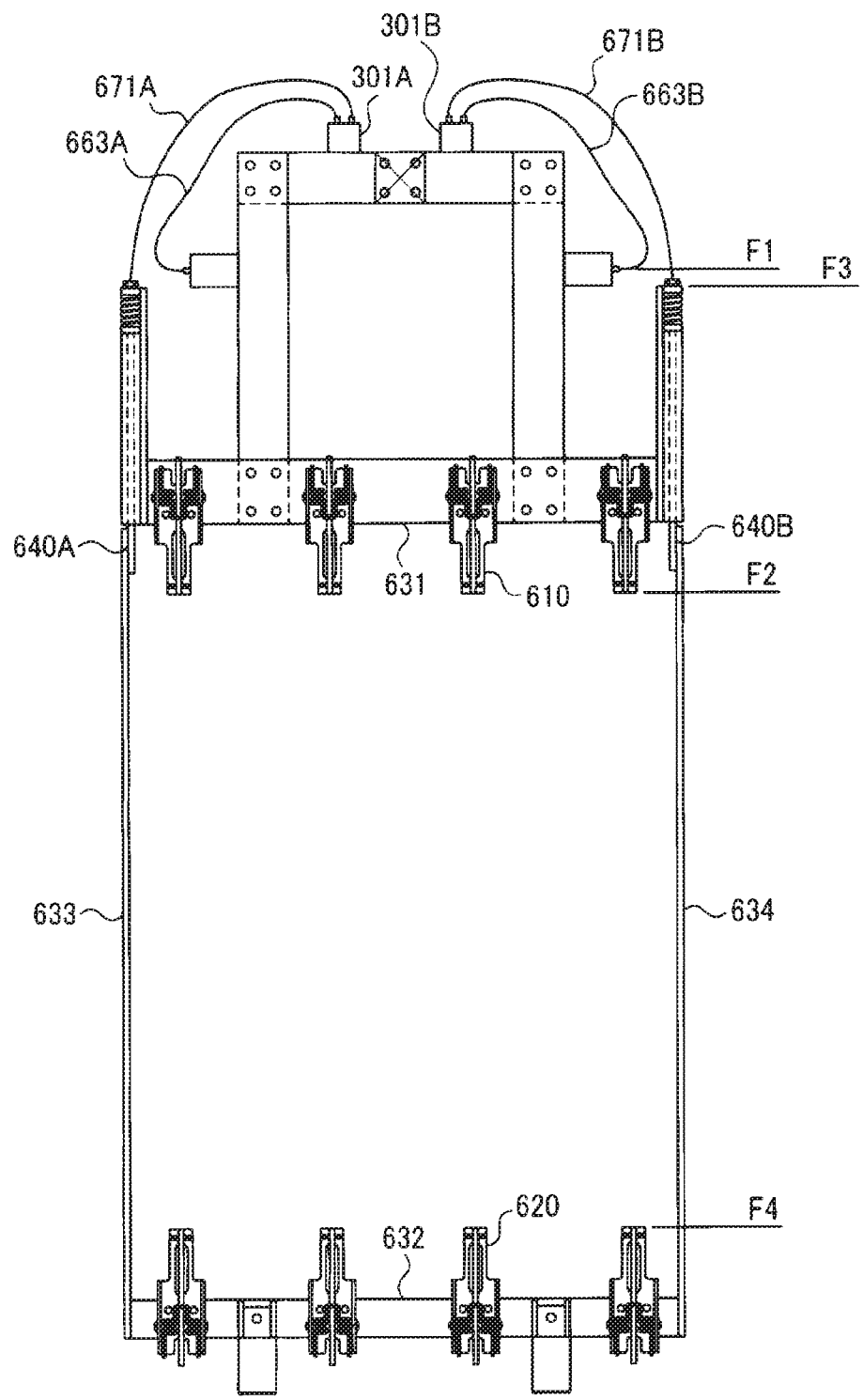
FIG. 17 is a view schematically illustrating the current-carrying section and the workpiece-holding section of the workpiece-holding jig illustrated in FIG. 13.

FIG. 17 schematically illustrates the current-carrying paths of the workpiece-holding jig 30B illustrated in FIG. 13. In FIG. 17, cables that are identical in length and cross-sectional area of the current-carrying section are used as the first upper frame current-carrying cable 663A, the second upper frame current-carrying cable 663B, the first vertical frame current-carrying cable 671A, and the second vertical frame current-carrying cable 671B. The resistance of the current-carrying path (F1 to F2 in FIG. 17) formed by the first current-carrying section 660 excluding the first upper frame current-carrying cable 663A and the second upper frame current-carrying cable 663B and the resistance of the current-carrying path (F3 to F4 in FIG. 17) formed by the second current-carrying section 670 excluding the first vertical frame current-carrying cable 671A and the second vertical frame current-carrying cable 671B are set to be substantially equal to each other.

Figure 18:
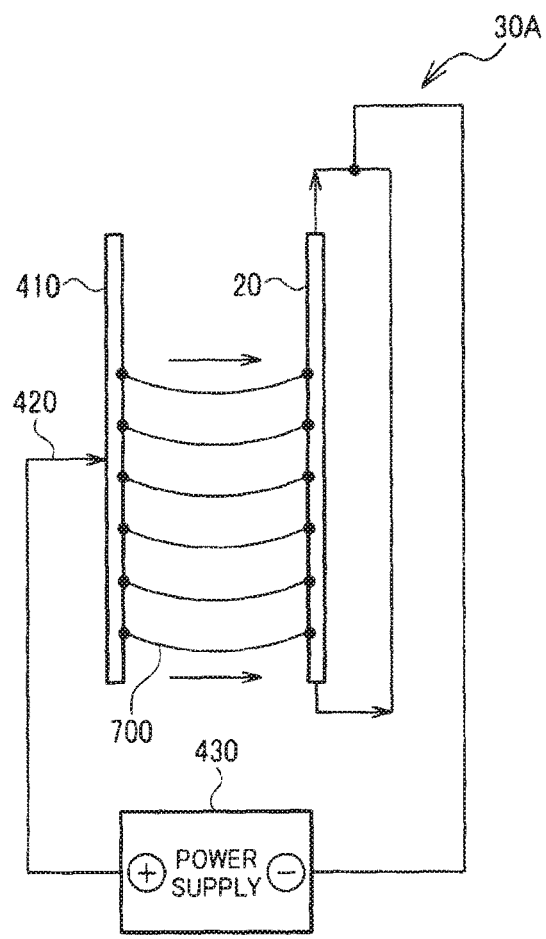
FIG. 18 is a view schematically illustrating a method that measures the current distribution of a workpiece.
Figure 19:
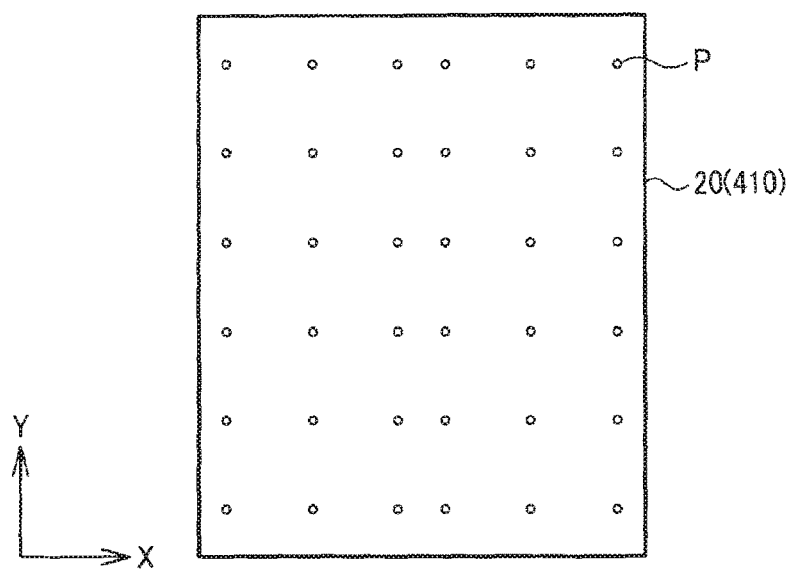
FIG. 19 is a view illustrating contact points of a workpiece and an anode.

The in-plane current distribution of the workpiece 20 was measured using the workpiece-holding jig 30B illustrated in FIG. 13 having the characteristics schematically illustrated in FIG. 17, and the anode 410L (410R) that employs the current supply method illustrated in FIG. 16. The measurement was performed using wires 700 illustrated in FIG. 18 that correspond to the liquid resistance instead of the treatment tank 200 illustrated in FIG. 1. As illustrated in FIG. 19, thirty-six contact points P provided in the workpiece 20 and thirty-six contact points P provided in the anode 410 were respectively connected using the wires 700. The positive terminal of a power supply 430 that includes a rectifier was connected to the anode 410 at a middle position in the vertical direction through the relay current-carrying section 420, and the negative terminal of the power supply 430 was connected to the common current-carrying sections 301A and 301B of the workpiece-holding jig 30B illustrated in FIG. 13.

Figure 20A:
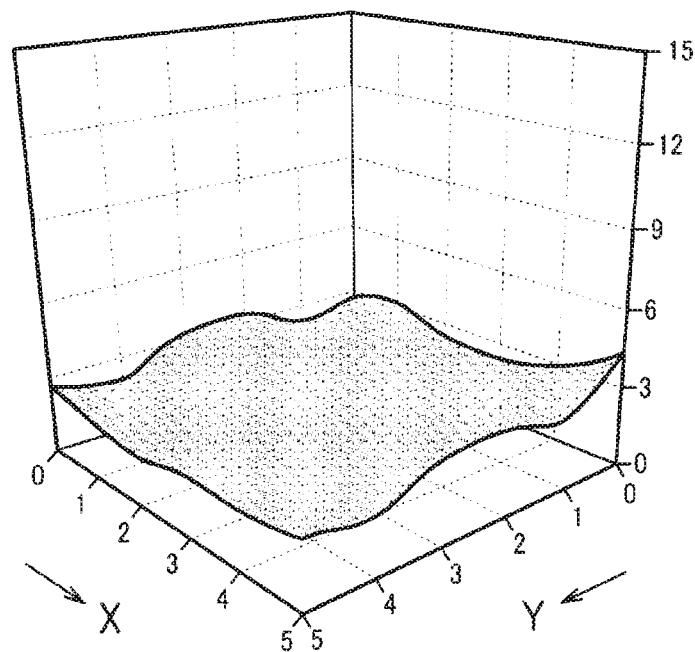
FIGS. 20A and 20B are views illustrating the current distribution of a workpiece held by the workpiece-holding jig illustrated in FIG. 6 and the current distribution of a workpiece held by the workpiece-holding jig illustrated in FIG. 13.
Figure 20B:
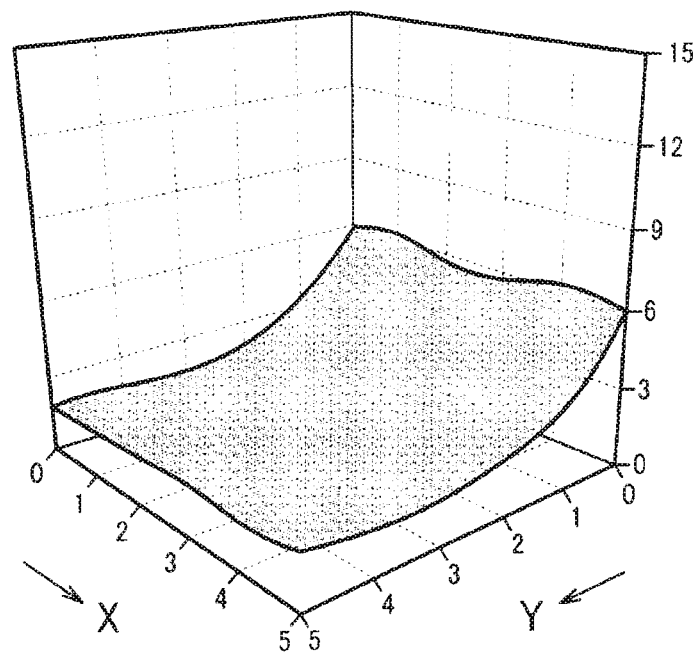

FIG. 20A illustrates the measurement data. FIG. 20B illustrates the measurement data obtained when using a comparative example in which the workpiece-holding jig 30A illustrated in FIG. 3 was used instead of the workpiece-holding jig 30B illustrated in FIG. 13, and current was supplied to the anode 410 illustrated in FIG. 16 directly from the anode bar 400. As is clear from the comparison between FIGS. 20A and 20B, the in-plane uniformity of the current distribution of the workpiece 20 was significantly improved by combining the workpiece-holding jig 30B according to one embodiment of the invention and the current supply method illustrated in FIG. 16. In particular, while the current value was large near the upper end of the workpiece 20 in FIG. 20B (comparative example), a variation in the current distribution of the workpiece 20 in the vertical direction was significantly reduced in FIG. 20A.

Although only some embodiments of the invention have been described in detail above, those skilled in the art will readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The invention also includes any combinations of the embodiments and the modifications.

For example, the common current-carrying section 301 of the workpiece-holding jig 30B need not necessarily be used. A current-carrying path from the current-carrying section 340 to the first chuck members 610 and a current-carrying path from the current-carrying section 340 to the second chuck members 620 may be separately provided. In this case, independent power supplies may be respectively connected to the two current-carrying paths.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A workpiece-holding jig that vertically holds a sheet rectangular workpiece in a solution contained in a treatment tank, and sets the rectangular workpiece as a cathode, the workpiece-holding jig comprising:

a frame member that is disposed to surround the rectangular workpiece and includes a conductive upper frame member and a conductive lower frame member electrically insulated from the conductive upper frame member;

a plurality of conductive first clampers that are supported by the upper frame member, and hold an upper side of the rectangular workpiece;

a plurality of conductive second clampers that are supported by the lower frame member in a state in which the plurality of second clampers are electrically insulated from the plurality of first clampers, and hold a lower side of the rectangular workpiece;

a first current-carrying section that supplies current to the plurality of first clampers; and a second current-carrying section that supplies current to the plurality of second clampers.

2. The workpiece-holding jig as defined in claim 1, the frame member further including:

two insulating members that are provided on either end of the upper frame member; and two conductive vertical frame members, an upper end of the two vertical frame members being respectively supported by the two insulating members, and a lower end of the two vertical frame members being connected to either end of the lower frame member, the first current-carrying section supplying current to the upper frame member, and the second current-carrying section supplying current to the two vertical frame members.

3. The workpiece-holding jig as defined in claim 2, further comprising:
- a common current-carrying section that supports the frame member via part of the first current-carrying section, and supplies current to the first current-carrying section and the second current-carrying section.

4. The workpiece-holding jig as defined in claim 3, the first current-carrying section including:
- an insulating section that is secured on the common current-carrying section;
- a conductive connection section that connects the insulating section and the upper frame member; and
- at least one upper frame current-carrying cable that connects the common current-carrying section and the connection section, and
- the second current-carrying section including a first vertical frame current-carrying cable and a second vertical frame current-carrying cable that connect the common current-carrying section and the two vertical frame members.

5. The workpiece-holding jig as defined in claim 4, the connection section including:
- a first vertical arm section and a second vertical arm section that connect the insulating section and the upper frame member;
- a first protrusion section that protrudes from the first vertical arm section; and
- a second protrusion section that protrudes from the second vertical arm section, and
- the at least one upper frame current-carrying cable including a first upper frame current-carrying cable that connects the common current-carrying section and the first protrusion section, and a second upper frame current-carrying cable that connects the common current-carrying section and the second protrusion section.

6. The workpiece-holding jig as defined in claim 3,
- a resistance of a current path from the common current-carrying section to the upper frame member and a resistance of a current path from the common current-carrying section to the lower frame member being set to be equal.

7. The workpiece-holding jig as defined in claim 5,
- each of the two insulating members including a guide hole that slidingly guides an upper end of either of the two vertical frame members in a vertical direction.

8. The workpiece-holding jig as defined in claim 7, further comprising:
- a spring that biases either of the two vertical frame member that is slidingly guided by the guide hole in a downward direction.

9. The workpiece-holding jig as defined in claim 8,
- a lower end of the spring being secured on either of the two vertical frame members that is slidingly guided by the guide hole,
- an upper end of the spring being secured on a conductive member that is supported by either of the two insulating members, and
- either of the first and second vertical frame current-carrying cables being connected to the conductive member.

\* \* \* \* \*